US011303852B2

(12) United States Patent
Takahashi et al.

(10) Patent No.: US 11,303,852 B2
(45) Date of Patent: Apr. 12, 2022

(54) SENSOR INFORMATION PROCESSING SYSTEM USING CONTAINER ORCHESTRATION TECHNIQUE

(71) Applicant: LATONA, INC., Tokyo (JP)

(72) Inventors: Satoshi Takahashi, Tokyo (JP); Antoine Sauvage, Tokyo (JP)

(73) Assignee: LATONA, INC., Tokyo (JP)

( * ) Notice: Subject to any disclaimer, the term of this patent is extended or adjusted under 35 U.S.C. 154(b) by 0 days.

(21) Appl. No.: 17/433,889

(22) PCT Filed: Mar. 5, 2020

(86) PCT No.: PCT/JP2020/009344
§ 371 (c)(1),
(2) Date: Aug. 25, 2021

(87) PCT Pub. No.: WO2020/184362
PCT Pub. Date: Sep. 17, 2020

(65) Prior Publication Data
US 2022/0046209 A1 Feb. 10, 2022

(30) Foreign Application Priority Data

Mar. 8, 2019 (JP) .............................. JP2019-043061

(51) Int. Cl.
*H04N 7/18* (2006.01)
*G06F 9/50* (2006.01)
*H04N 17/00* (2006.01)

(52) U.S. Cl.
CPC ............. *H04N 7/18* (2013.01); *G06F 9/5011* (2013.01); *H04N 17/002* (2013.01)

(58) Field of Classification Search
CPC ...... H04N 7/18; H04N 17/002; G06F 9/5011; G06F 8/36; G06F 8/60; G06F 17/30
(Continued)

(56) References Cited

U.S. PATENT DOCUMENTS 9,985,827 B2    5/2018 Li
10,216,485 B2 * 2/2019 Misra .................. G06F 8/60
(Continued)

FOREIGN PATENT DOCUMENTS

JP    2006-188334 A    7/2006
WO    2013/136462 A1   9/2013

OTHER PUBLICATIONS

International Search Report issued in PCT/JP2020/009344; dated Jun. 16, 2020.
(Continued)

*Primary Examiner* — Trang U Tran
(74) *Attorney, Agent, or Firm* — Studebaker & Brackett PC

(57) ABSTRACT

An information processing device includes a container engine configured to logically allocate hardware resources on an operating system, construct a cluster for operating a container using the allocated hardware resources, and operate the container on the cluster, and an orchestration tool configured to construct a node that serves as an execution environment of a pod including one or more containers on the cluster, manage an operation of the pod on the node, and perform a restoration operation on the pod when the pod is not in a predetermined operating state. Further, the pods include a reliability calculation pod configured to calculate a reliability of each sensor based on sensor information acquired from the sensor, and a sensor information processing pod configured to perform predetermined information processing based on sensor information from one or more of the sensors calculated to have a high reliability by the reliability calculation pod.

8 Claims, 17 Drawing Sheets

(58) Field of Classification Search
USPC .......................................................... 348/86
See application file for complete search history.

(56) References Cited

U.S. PATENT DOCUMENTS

| | | | |
|---|---|---|---|
| 10,395,195 B2* | 8/2019 | Kapasi | G06F 9/5077 |
| 11,017,092 B2* | 5/2021 | Smith | G06F 21/602 |
| 11,057,431 B2* | 7/2021 | Goyal | H04L 63/10 |

OTHER PUBLICATIONS

Written Opinion of the International Searching Authority issued in PCT/JP2020/009344; dated Jun. 16, 2020.

* cited by examiner

SENSOR INFORMATION PROCESSING SYSTEM USING CONTAINER ORCHESTRATION TECHNIQUE

TECHNICAL FIELD

The present invention relates to a sensor information processing system using a container orchestration technique, a method for controlling a sensor information processing system, a computer program used to control a sensor information processing system, and a recording medium storing the computer program.

BACKGROUND ART

A system executed by a computer implements a predetermined function by a plurality of applications operating on an operating system (OS) installed on a host PC. However, when operating the plurality of applications at the same time, it is necessary to share system resources in the OS among the applications, so that application design must be changed for each OS, which imposes a heavy development burden.

Therefore, there is known a technique of creating a logical section on the OS of the host computer and deploying in the logical section a container that summarizes an environment required for operating the application in addition to the application itself. According to this technique, the resources on the OS can be logically separated and used by a plurality of containers, so that an OS dependency of the operating environment is reduced, and a burden of system development can be reduced. Such a container technique is implemented by container management software installed on the OS. For example, Docker is an example of the container management software.

In recent years, with evolution of the container technique and a demand for system redundancy, network connection, storage area, and host PC settings have become complicated, and a need for scheduling a plurality of containers has increased. Therefore, development of an orchestration tool that automatically performs these settings and integrally manages containers is in progress.

By using the orchestration tool, it is possible to easily deploy, execute, manage, and schedule a plurality of containers, so that the burden of system development can be further reduced. Examples of known container orchestration tools include Kubernetes, Apache Mesos, and the like (for example, Patent Literature 1).

CITATION LIST

Patent Literature

Patent Literature 1: U.S. Pat. No. 9,985,827

SUMMARY OF INVENTION

Technical Problem

In factories and the like, in order to manage a manufacturing process, a large number of sensors are provided for each process, and a sensor information processing system that processes sensor information acquired by the sensors into various types of information is used. In recent years, it has been studied to develop such a sensor information processing system on a platform using the above-mentioned container technique and container orchestration technique.

In the factories and the like, some sensors may stop operating or may not operate normally for various reasons. In the related art, when this kind of event occurs and no sensor abnormality is detected, various processes may be performed based on abnormal sensor information. In order to implement this type of sensor restoration, it may be necessary to restart a system including the sensor and software related thereto, which is inconvenient. Further, when a scale of the sensor system is changed significantly by changing the number of sensors significantly, it may be necessary to redesign the entire sensor system.

An object of the present invention is to solve such a problem and to provide a sensor information processing technique having both robustness that can withstand changes in state of sensors in operation while using highly reliable sensor information and flexibility that can respond to changes in system scale and the like, in a sensor information processing system using a container orchestration tool.

Solution to Problem

A sensor information processing system according to one aspect of the present invention is a sensor information processing system including one or more sensors and one or more information processing devices connected to the sensor. The information processing device includes a container engine configured to logically allocate hardware resources on an operating system, construct a cluster for operating a container using the allocated hardware resources, and operate the container on the cluster, and an orchestration tool configured to construct a node that serves as an execution environment of a pod including one or more containers on the cluster, manage an operation of the pod on the node, and perform a restoration operation on the pod when the pod is not in a predetermined operating state. Further, the pods include a reliability calculation pod configured to calculate a reliability of each sensor based on sensor information acquired from the sensor, and a sensor information processing pod configured to perform predetermined information processing based on sensor information from one or more of the sensors calculated to have a high reliability by the reliability calculation pod.

Advantageous Effects of Invention

According to such a configuration, a sensor information processing technique having both robustness that can withstand changes in state of sensors in operation while using highly reliable sensor information and flexibility that can respond to changes in system scale and the like, can be provided.

DESCRIPTION OF EMBODIMENTS

Embodiments of the present invention will be described in detail below with the accompanying drawings.

Figure 1:
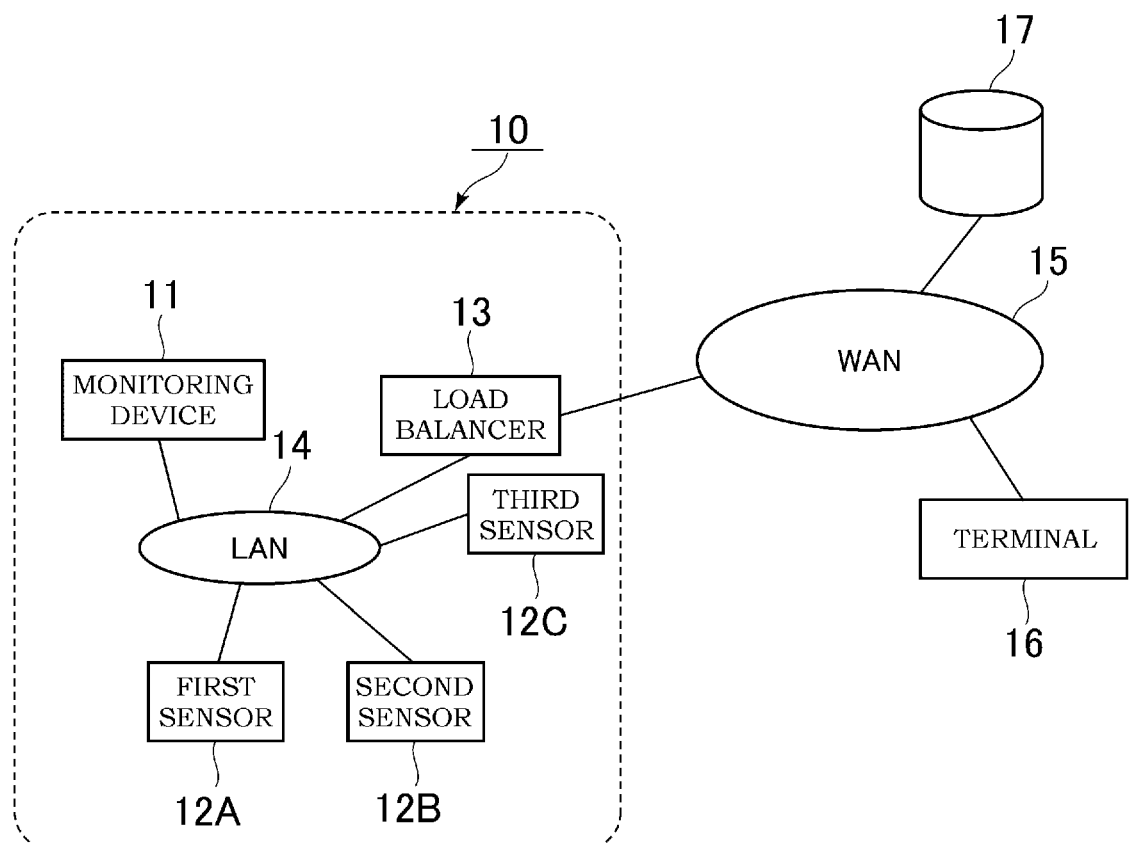
FIG. 1 is a block diagram showing a configuration of a monitoring system according to the present embodiment.

FIG. 1 is a block diagram showing a configuration of a monitoring system 10 according to an embodiment of the present invention.

The monitoring system 10 is a system for monitoring manufacturing processes in a factory or the like, and includes a monitoring device 11, a first sensor 12A, a second sensor 12B, a third sensor 12C, and a load balancer 13. The monitoring device 11, the first sensor 12A, the second sensor 12B, the third sensor 12C, and the load balancer 13 are configured to be able to communicate with each other via a local area network (LAN) 14. In the following, when it is not necessary to distinguish configurations of the first sensor 12A, the second sensor 12B, and the third sensor 12C, these sensors are collectively referred to as a sensor 12. The same applies to other configurations, that is, when there is a plurality of same configurations and it is not necessary to distinguish these configurations, these configurations are collectively described by omitting subscripts.

The monitoring device 11 is a device including a central processing unit (CPU), a memory, a network interface, and the like, and is configured to be able to execute a stored program. The monitoring device 11 may be implemented by using a general-purpose computer, or may be a dedicated terminal having the above configurations.

The monitoring device 11 includes middleware that implements container orchestration installed on an operating system (OS). Then, in the monitoring device 11, a container that monitors sensor information acquired by the sensor 12 is deployed, and a monitoring function is implemented by the container executing a predetermined process. A hardware configuration of the monitoring device 11 will be described later with reference to FIG. 3, and a software configuration thereof will be described with reference to FIG. 4.

The sensor 12 is a sensor that monitors a state of the manufacturing process in the factory. The sensor 12 is, for example, an imaging sensor such as a camera, and transmits image data captured to the monitoring device 11 via the LAN 14. The sensor 12 is not limited to the imaging sensor, and may be a sensor such as a temperature sensor, a vibration sensor, or an illuminance sensor, or may be a combination of various sensors, as will be described later. A hardware configuration of the sensor 12 will be described later with reference to FIG. 5, and a software configuration thereof will be described with reference to FIG. 6.

Similar to the monitoring device 11, the load balancer 13 is a device including a CPU, a memory, a network interface, and the like, and is configured to be able to execute a stored program. The load balancer 13 may have a configuration similar to that of a general-purpose data server, for example.

Similar to the monitoring device 11, the load balancer 13 includes a container orchestration tool installed on the OS. The load balancer 13 is connected to a wide area network (WAN) 16 and is configured to be able to communicate with a device connected to the WAN 15 in addition to a device connected to the LAN 14 such as the monitoring device 11. In the present embodiment, the load balancer 13 is formed separately from the monitoring device 11, but the present invention is not limited to this. The monitoring device 11 and the load balancer 13 may be integrally formed and connected to the LAN 14.

A terminal 16 and an image registry 17 are connected to the WAN 15, and the WAN 15 is connected to the monitoring system 10 via the load balancer 13. Therefore, the terminal 16 and the image registry 17 can communicate with the devices in the monitoring system 10 such as the monitoring device 11 via the load balancer 13.

The terminal 16 is a device including a display, a CPU, a memory, a network interface, and the like, is connected to the monitoring device 11 via the load balancer 13, and displays a monitoring result transmitted from the monitoring device 11. The terminal 16 is, for example, an information terminal including a display unit such as a personal computer, a smartphone, and a tablet terminal.

The image registry 17 is a server that can store data, and stores an container image deployed on the monitoring device 11. The container image stored in the image registry 17 is transmitted to the monitoring device 11 via the WAN 15, the load balancer 13, and the LAN 14, and the container is deployed. In the present embodiment, the image registry 17 is configured to be connected to the WAN 15, but is not limited to this. The image registry 17 may be configured to be connected to the LAN 14, or two image registries 17 may be configured to be connected to the LAN 14 and the WAN 16 so as to communicate with each other.

Figure 2:
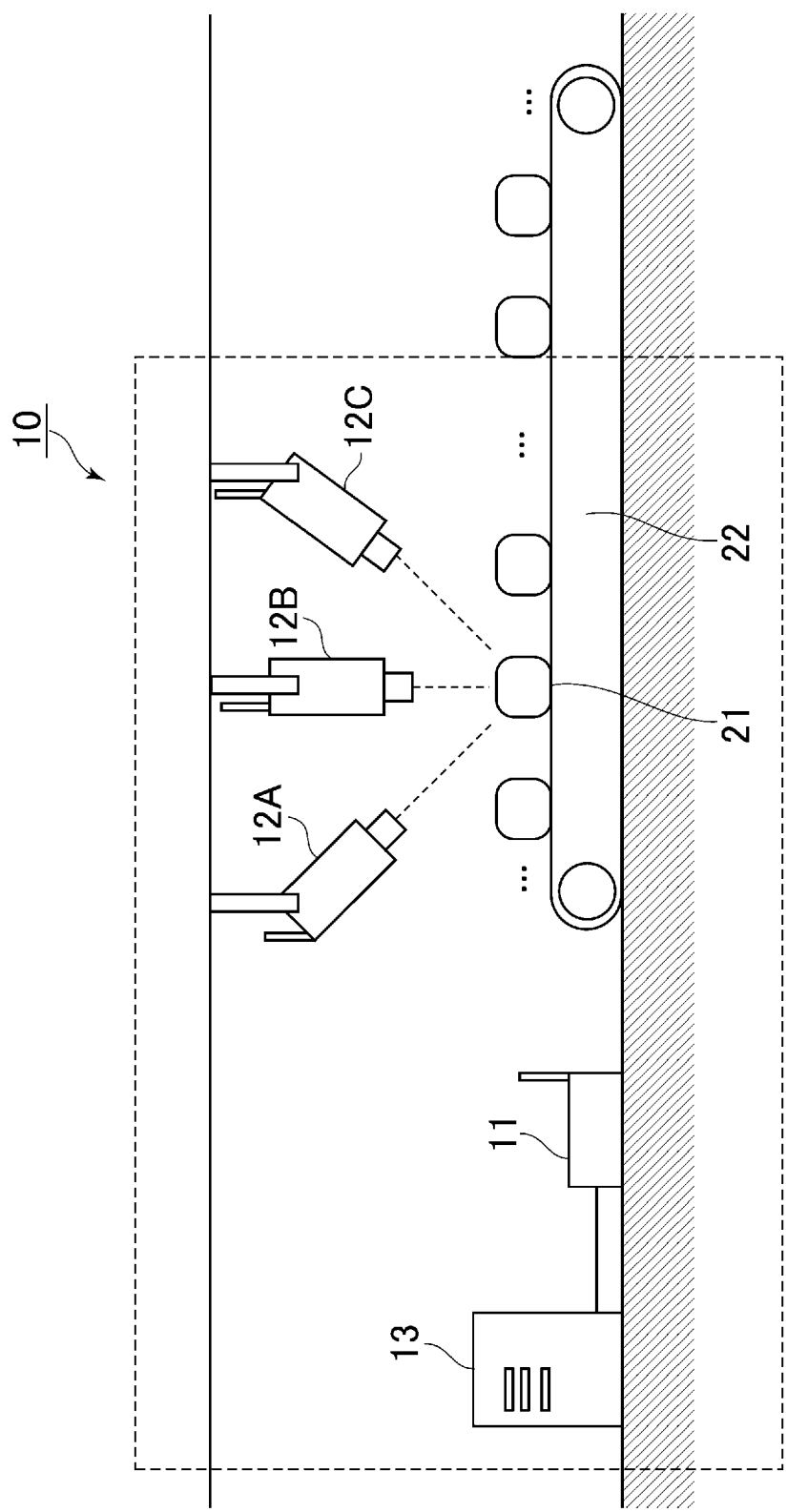
FIG. 2 is a schematic configuration diagram of the monitoring system.

FIG. 2 is a schematic configuration diagram of the monitoring system 10.

The monitoring system 10 is a device that monitors manufacturing processes in a factory or the like. As described above, the monitoring device 11, the sensor 12, and the load balancer 13 are wirelessly connected to the LAN 14 (not shown in FIG. 2). The load balancer 13 is connected to the WAN 15 (not shown in FIG. 2) in addition to the LAN 14.

In the factory, a product 21 moves on a belt conveyor 22. The first sensor 12A, the second sensor 12B, and the third sensor 12C capture images of the product 21 from different angles and transmit the captured images to the monitoring device 11 as the sensor information. In this way, the product 21 becomes an object to be monitored by the monitoring system 10.

Figure 3:
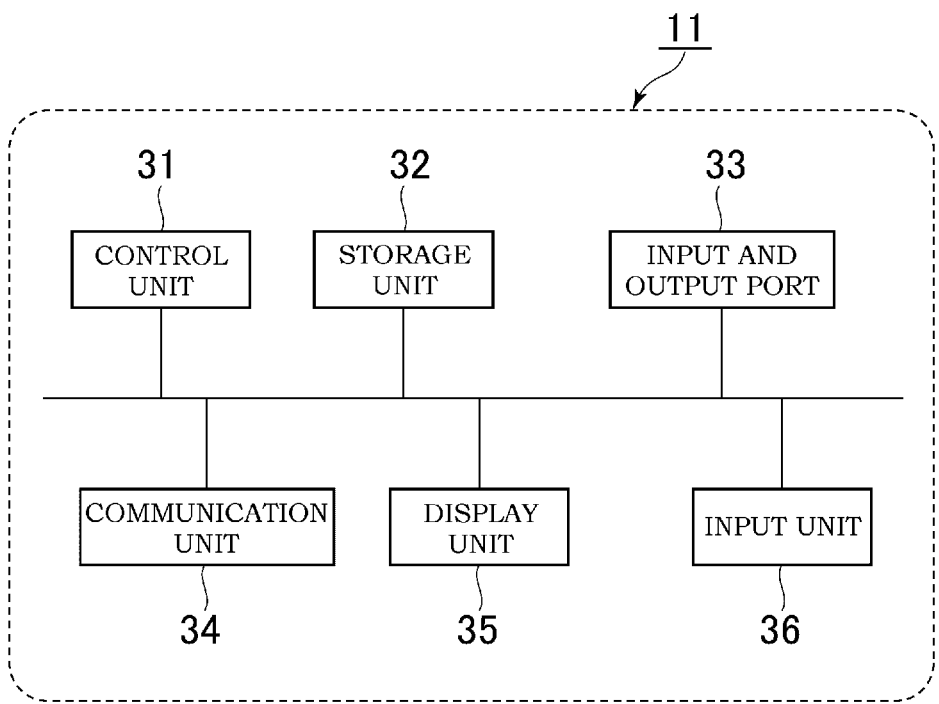
FIG. 3 is a hardware configuration diagram of a monitoring device.

FIG. 3 is a hardware configuration diagram of the monitoring device 11.

The monitoring device 11 includes a control unit 31 that is implemented by a CPU controlling the whole system and a graphics processing unit (GPU), a storage unit 32 that is implemented by a read only memory (ROM), a random access memory (RAM), a hard disk, or the like and stores programs, various data, and the like, an input and output port 33 that inputs and outputs data to and from an external device, a communication unit 34 that performs communication via the LAN 14, a display unit 35 that is implemented by a display, an LED, a speaker, or the like and performs display according to the data, and an input unit 36 that accepts input from outside. The control unit 31, the storage unit 32, the input and output port 33, the communication unit 34, the display unit 35, and the input unit 36 are configured to be able to communicate with each other by bus connection.

Figure 4:
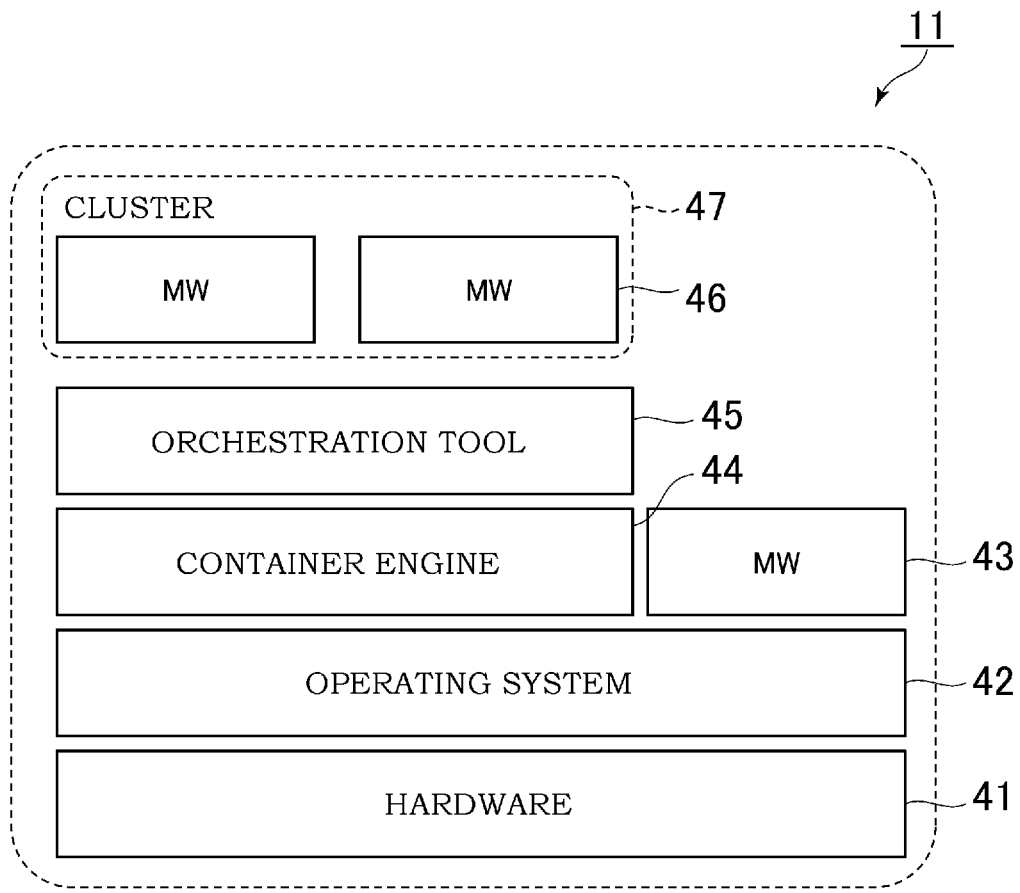
FIG. 4 is a software configuration diagram of the monitoring device using a container technique.
Figure 7:
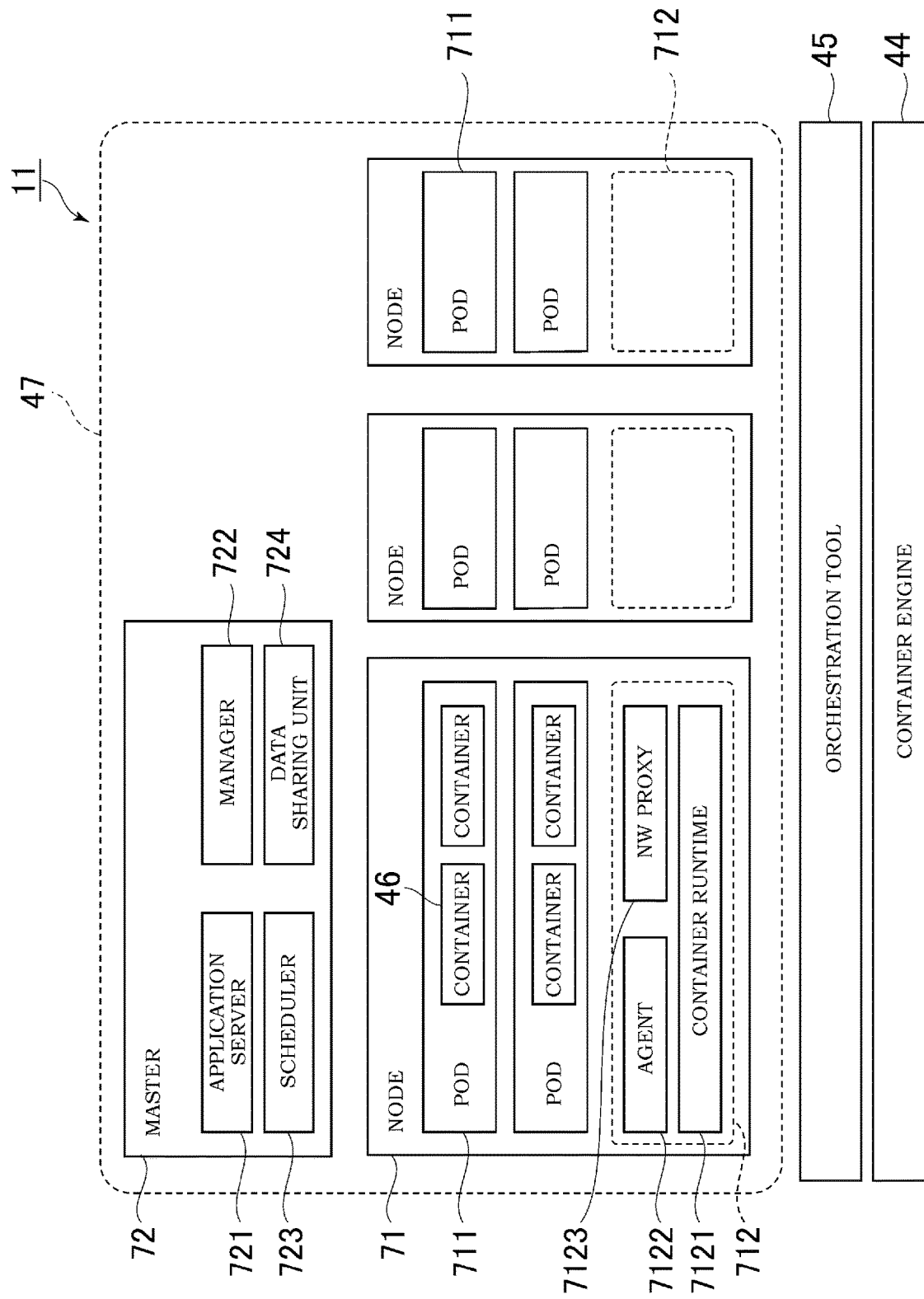
FIG. 7 is a schematic configuration diagram of a general container operating environment when an orchestration tool is used.

FIG. 4 is a software configuration diagram of the monitoring device 11. Hereinafter, an overall outline of software configured with a container technique in the present embodiment will be described with reference to FIG. 4. FIG. 7 below shows a configuration of a cluster, which is an operating environment of a container when operation is controlled by an orchestration tool.

In the monitoring device 11, an operating system (OS) 42 is installed on hardware 41. In the operating system 42, in addition to general-purpose middleware 43, a container engine 44 and an orchestration tool 45 that operates together with the container engine 44 are installed.

In the monitoring device 11, the container engine 44 and the orchestration tool 45 configure a cluster 47, which is an operating environment of a container 46, and the container 46 is deployed and executed in the cluster 47. The container 46 is configured to implement a predetermined function, and a desired function is implemented in the monitoring device 11 by operating a plurality of containers 46.

The hardware 41 is provided with the hardware configuration shown in FIG. 3. Using these resources of the hardware 41, the monitoring device 11 can perform a predetermined operation.

The operating system 42 is a basic system of the software configuration in the monitoring device 11. The operating system 42 controls an overall operation of the monitoring device 11.

The general-purpose middleware 43 is a functional block generally provided by a vendor of the operating system 42 or the like, and is a functional block for implementing basic operations such as a communication function by the communication unit 34, a display operation by the display unit 35, and input control from the input unit 36 shown in FIG. 3.

The container engine 44 is one of the middleware installed in the operating system 42, and is an engine that operates the container 46. Specifically, the container engine 44 allocates resources of the hardware 41 and the operating system 42 to the container 46 based on a configuration file included in the middleware 48 in the container 46 and the like.

The orchestration tool 45 is a functional block that allows the container engine 44 to appropriately allocate the resources of the hardware 41 and the like. The orchestration tool 45 groups one or more containers 46 into a unit called a pod (not shown in FIG. 4), and each pod is deployed to a node (not shown in FIG. 4) that is a logically different area. Details of the orchestration tool 45 will be described later with reference to FIG. 5.

The container 46 includes middleware such as a library as well as an application that implements a predetermined function. The container 46 operates using the resources of the hardware 41 and the operating system 42 allocated by the container engine 44. Allocation of the resources to the container 46 by the container engine 44 is performed based on the configuration file included in the middleware in the container 46 and the like. In this way, since resource management is guaranteed by the container engine 44, environment dependency of the operation of the container 46 can be reduced.

As described above, in the present embodiment, the monitoring device 11 includes the GPU. The GPU is a processor developed for image processing, and is generally known to process matrix operations faster than a general-purpose CPU. In performing machine learning (artificial intelligence (AI) learning) such as deep learning, a huge amount of matrix operations are often required. Therefore, the monitoring device 11 equipped with the GPU has a configuration suitable for machine learning by the container 46.

Figure 5:
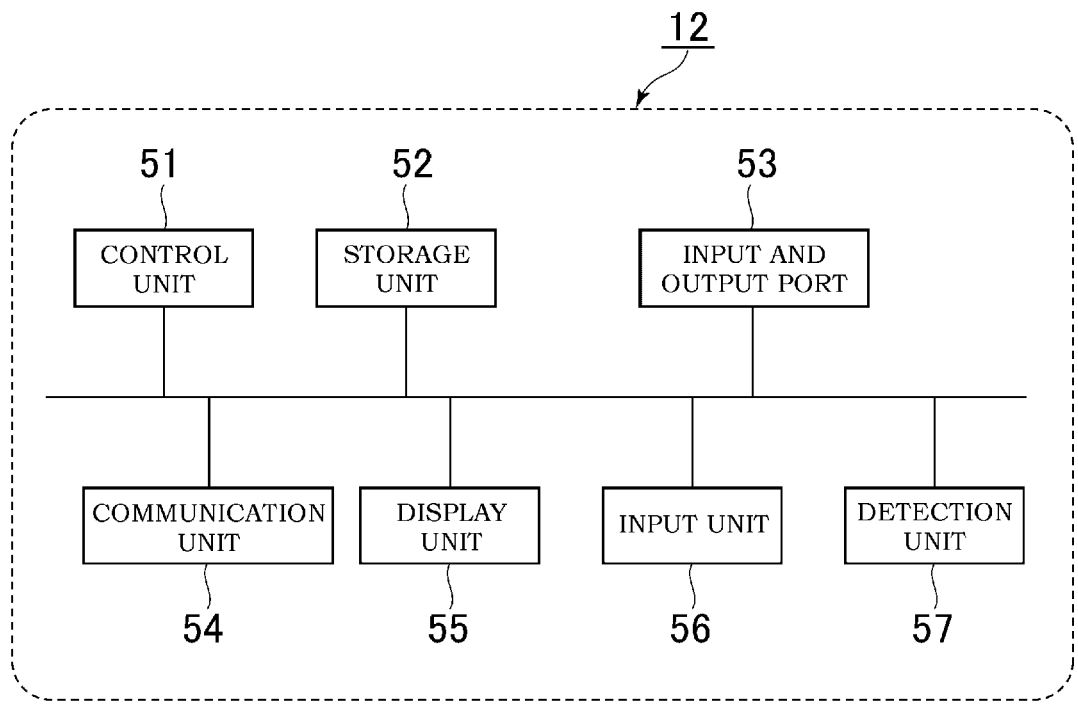
FIG. 5 is a hardware configuration diagram of a sensor.

FIG. 5 is a hardware configuration diagram of the sensor 12.

As shown in FIG. 5, the sensor 12 includes a control unit 51 that is implemented by a CPU or the like and controls the entire system, a storage unit 52 that is implemented by an ROM, an RAM, or the like and stores programs, various data, and the like, an input and output port 53 that inputs and outputs data to and from an external device, a communication unit 54 that performs communication via the LAN 14, a display unit 55 that performs display according to the data, an input unit 56 that accepts input from the outside, and a detection unit 57 that detects an external state. The control unit 51, the storage unit 52, the input and output port 53, the communication unit 54, the display unit 55, the input unit 56, and the detection unit 57 are connected by a bus and are configured to be able to communicate with each other.

The detection unit 57 is an image sensor used in a digital camera or the like as an example in the present embodiment. Data captured by the detection unit 57 is converted into image data by the control unit 51. The converted image data is output as the sensor information from the communication unit 54 to the monitoring device 11 via the LAN 14.

Figure 6:
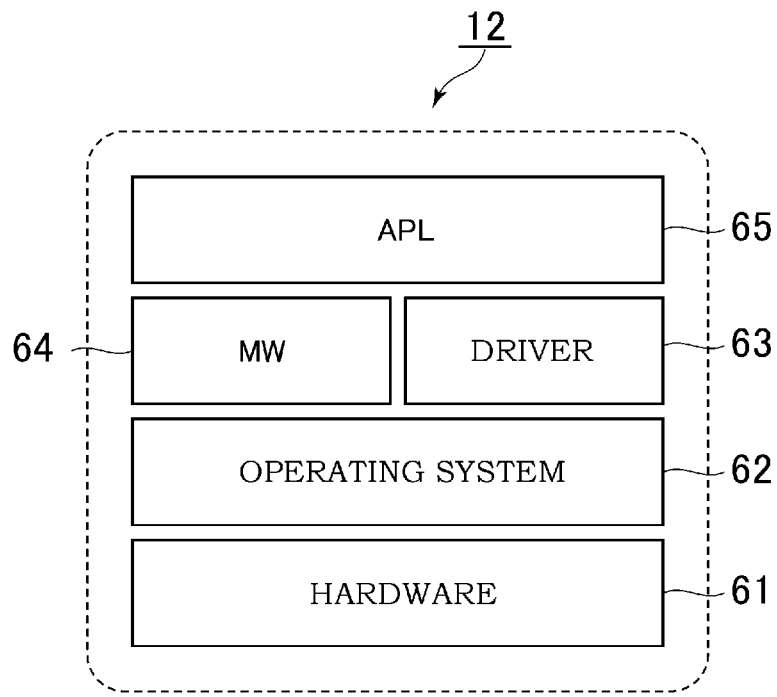
FIG. 6 is a software configuration diagram of the sensor.

FIG. 6 is a software configuration diagram of the sensor 12.

In the sensor 12, an operating system 62 is installed on hardware 61. A general-purpose driver 63 and middleware 64 operate in the operating system 62. The detection unit 57 provided in the hardware 61 is operated by the driver 63. An application 65 performs a predetermined operation on the driver 63 and the middleware 64.

In the present embodiment, since the sensor 12 is a camera, analog data acquired by the hardware 61, which is an image sensor and operated by the driver 63, is converted into image data by the middleware 64 and then transmitted to the monitoring device 11. The application 65 is configured to be able to power on and off and restart the camera via a network. The container engine 44 and the orchestration tool 45 of the monitoring device 11 as shown in FIG. 4 are not installed on the sensor 12.

FIG. 7 is a schematic configuration diagram of software in the typical cluster 47 when the orchestration tool 45 is used.

The orchestration tool 45 configures the cluster 47 as a logical space in which the container 46 operates in order to manage the hardware resources allocated by the container engine 44.

In the present embodiment, the orchestration tool 45 uses the hardware resources of the monitoring device 11 to form the cluster 47. As another example, if another hardware provided with the orchestration tool 45 is installed in parallel with the monitoring device 11, the cluster 47 is formed using resources of the monitoring device 11 and the other hardware.

The orchestration tool 45 manages an execution environment of the container 46 in a unit called a node 71. At the same time, the orchestration tool 45 is provided with a master 72 that manages operation of all nodes 71.

Two pods 711 are deployed on the node 71 in the example shown in this drawing. The pods 711 are functional blocks that are formed by a plurality of containers 46 and implement a predetermined service, and this drawing shows an example with two containers 46. The pod 711 is a unit under which the containers 46 are managed by the orchestration tool 45. Overall operation of the pods 711 in the node 71 is controlled by a pod management library 712.

The pod management library 712 includes a container runtime 7121 for causing the pods 711 (containers 46) to use the logically allocated hardware resources, an agent 7122 that accepts control from the master 72, a network (NW) proxy 7123 via which the pods 711 or the node 71 and the master 72 or the like communicate with each other. According to the pod management library 712 with such a configuration, the pods 711 implement a predetermined function by using the hardware resources while communicating with a pod 711 in the same node 71 or a pod 711 of another node 71.

Figure 11:
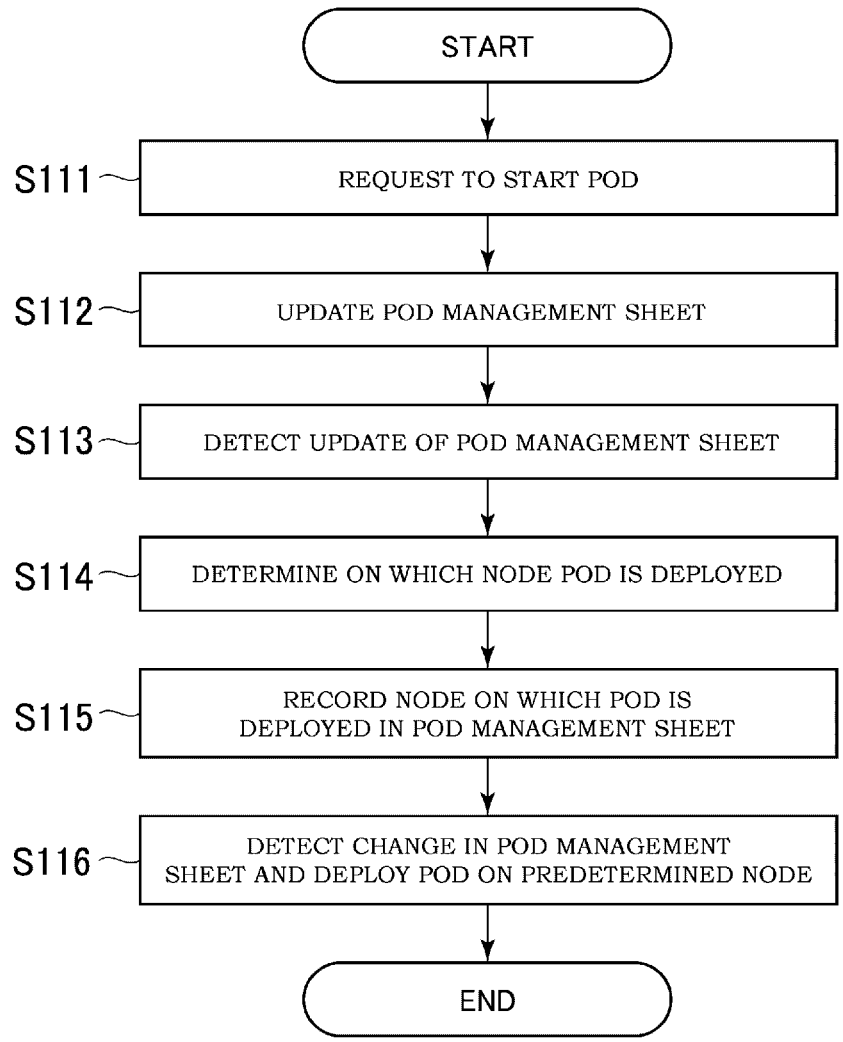
FIG. 11 is a flowchart showing a pod start process in the monitoring device.
Figure 14:
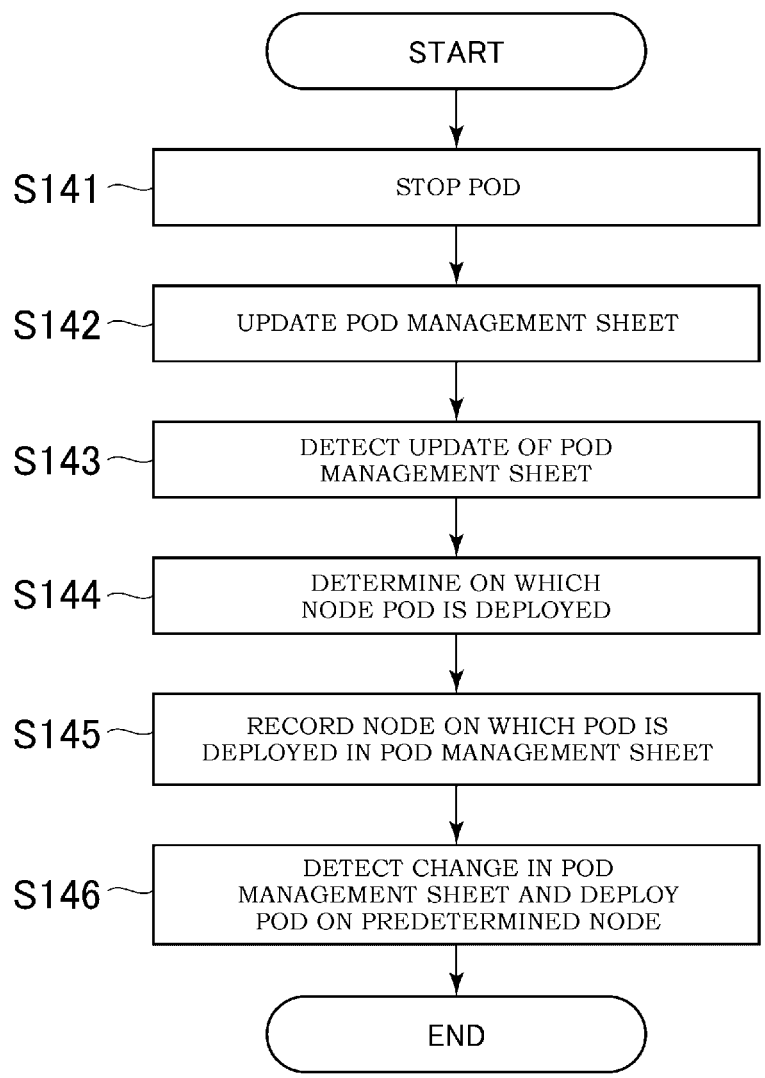
FIG. 14 is a flowchart showing a pod restart process.

The master 72 includes an application server 721 that deploys the pods 711 in response to input from the terminal 16, a manager 722 that manages a deployment state of the container 46 in the application server 721, a scheduler 723 that determines on which node 71 the container 46 is placed, a data sharing unit 724 that shares data, and the like. As examples of operation by the master 72, a start operation of the pods 711 is shown in FIG. 11, and a restart operation is shown in FIG. 14.

Figure 8:
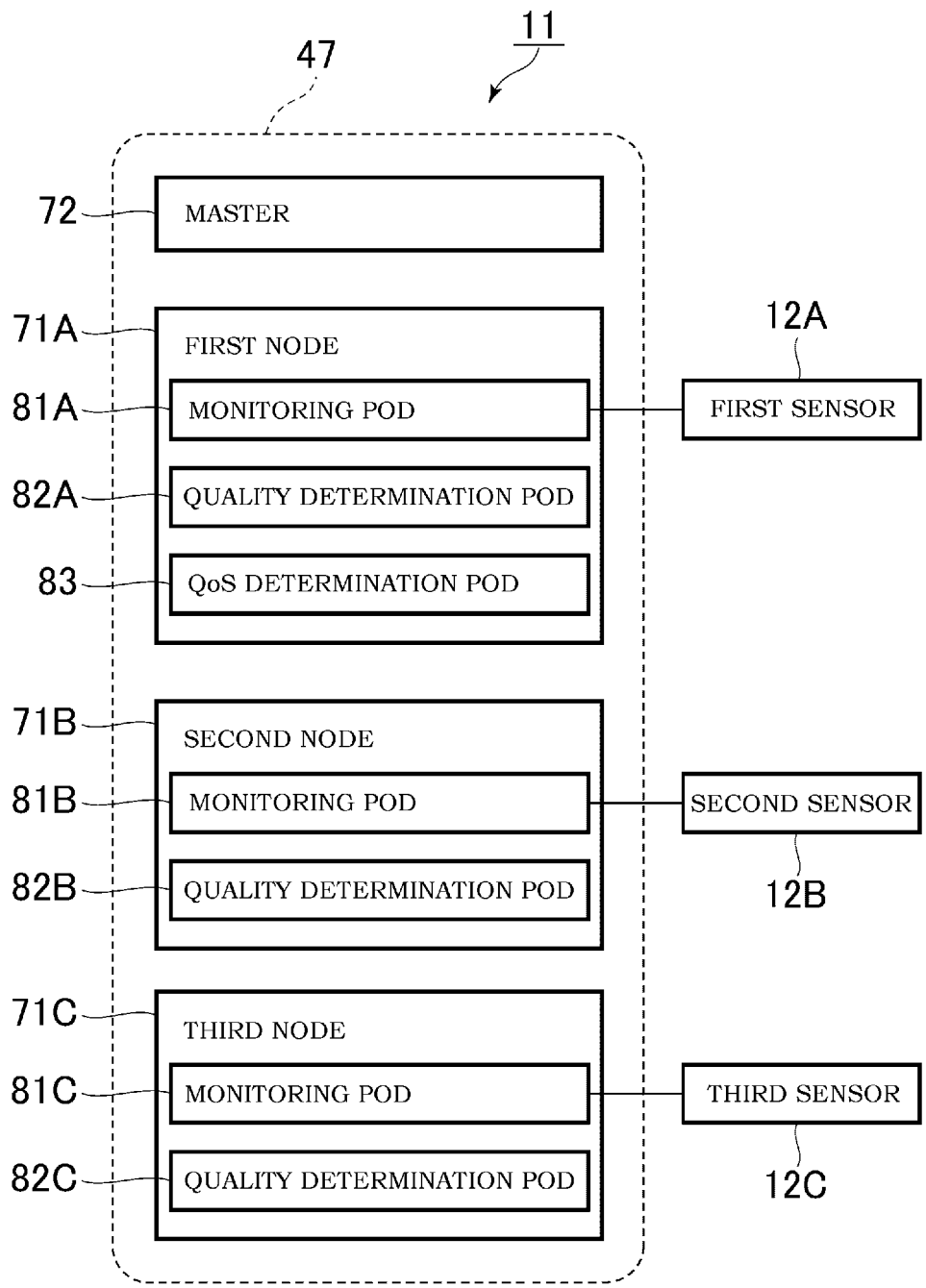
FIG. 8 is a schematic configuration diagram of a cluster.

FIG. 8 is a schematic configuration diagram of the cluster 47 according to the present embodiment. In this drawing, a configuration of each pod 711 in a configuration shown in FIG. 7 is clarified. In this drawing, for readability, the pod management library 712 in the node 71 and the internal configuration of the master 72 shown in FIG. 7 are omitted. Description of the plurality of containers 46 constituting the pod 711 is also omitted.

The cluster 47 implemented by the hardware resources of the monitoring device 11 includes one master 72 and three nodes 71, that is, a first node 71A, a second node 71B, and a third node 71C.

In the first node 71A, a monitoring pod 81A, a quality determination pod 82A, and a QoS determination pod 83 are deployed. Each of the monitoring pod 81A, the quality determination pod 82A, and the QoS determination pod 83 performs a predetermined process to implement a desired function as a whole. In the second node 71B, a monitoring pod 81B and a quality determination pod 82B are deployed. In the third node 71C, a monitoring pod 81C and a quality determination pod 82C are deployed. The monitoring pod 81 and the quality determination pod 82 are examples of a reliability determination pod. The QoS determination pod 83 is an example of a sensor information processing pod.

The monitoring pod 81A, the quality determination pod 82A, and the QoS determination pod 83 of the first node 71A, the monitoring pod 81B and the quality determination pod 82B of the second node 71B, and the monitoring pod 81C and the quality determination pod 82C of the third node 71C are configured to be able to communicate with each other by the network proxy 7123 of the pod management library 712 shown in FIG. 7.

Further, the monitoring pod 81A is configured to be able to communicate with the first sensor 12A, the monitoring pod 81B is configured to be able to communicate with the second sensor 12B, and the monitoring pod 81C is configured to be able to communicate with the third sensor 12C. That is, in the example shown in the drawing, each monitoring pod (81A, 81B, 81C) or each node (71A, 71B, 71C) is associated one-to-one with each sensor (12A, 12B, 12C). A communication network connecting inside and outside of the cluster 47 will be described later with reference to FIG. 9.

When the monitoring pod 81A receives the image data captured by the first sensor 12A, the monitoring pod 81A transmits the image data to the quality determination pod 82A at a predetermined timing. At the same time, the monitoring pod 81A may transmit the image data to the terminal 16 via the LAN 14 and the WAN 15.

The quality determination pod 82A includes a determination engine including a trained model that has learned a correspondence between the input image and a recognition and a detection accuracy of an object in the image. This determination engine is stored in the image registry 17 or the like, and is downloaded to the quality determination pod 82A in advance. When the quality determination pod 82A receives the image data captured by the first sensor 12A from the monitoring pod 81A, the quality determination pod 82A uses the determination engine to calculate values related to the recognition and the detection accuracy of the object in the image according to the image data, that is, a reliability of the sensor 12. The quality determination pod 82A determines that the sensor 12 does not operate normally when this reliability is extremely low. For example, if the recognition and the detection accuracy of the object in the image by the first sensor 12A is corresponding to the expectation by 80%, the reliability of the first sensor 12A is 80%.

Similarly, in the second node 71B, the monitoring pod 81B receives image data captured by the second sensor 12B, and the quality determination pod 82B acquires a reliability of the second sensor 12B based on the image data. In the third node 71C, the monitoring pod 81C receives image data captured by the third sensor 12C, and the quality determination pod 82C acquires a reliability of the third sensor 12C based on the image data.

The reliability of the sensor 12 may be determined using data other than the image data. For example, when a temperature sensor is used, other sensor data such as temperature data may be used. The sensors 12 may be used in combination. For example, in a case of a camera with a temperature sensor, the reliability may be calculated based on an operating temperature of the sensor 12 acquired by the temperature sensor and the image data.

The QoS determination pod 83 receives, from the quality determination pod 82A of the first node 71A, the quality determination pod 82B of the second node 71B, and the quality determination pod 82C of the third node 71C, the reliability of the sensor 12 acquired by each quality determination pod 82. Then, the QoS determination pod 83 determines presence or absence of the failed sensor 12 and determines a quality of the product 21 based on information acquired by the sensor 12 having a high reliability.

Figure 9:
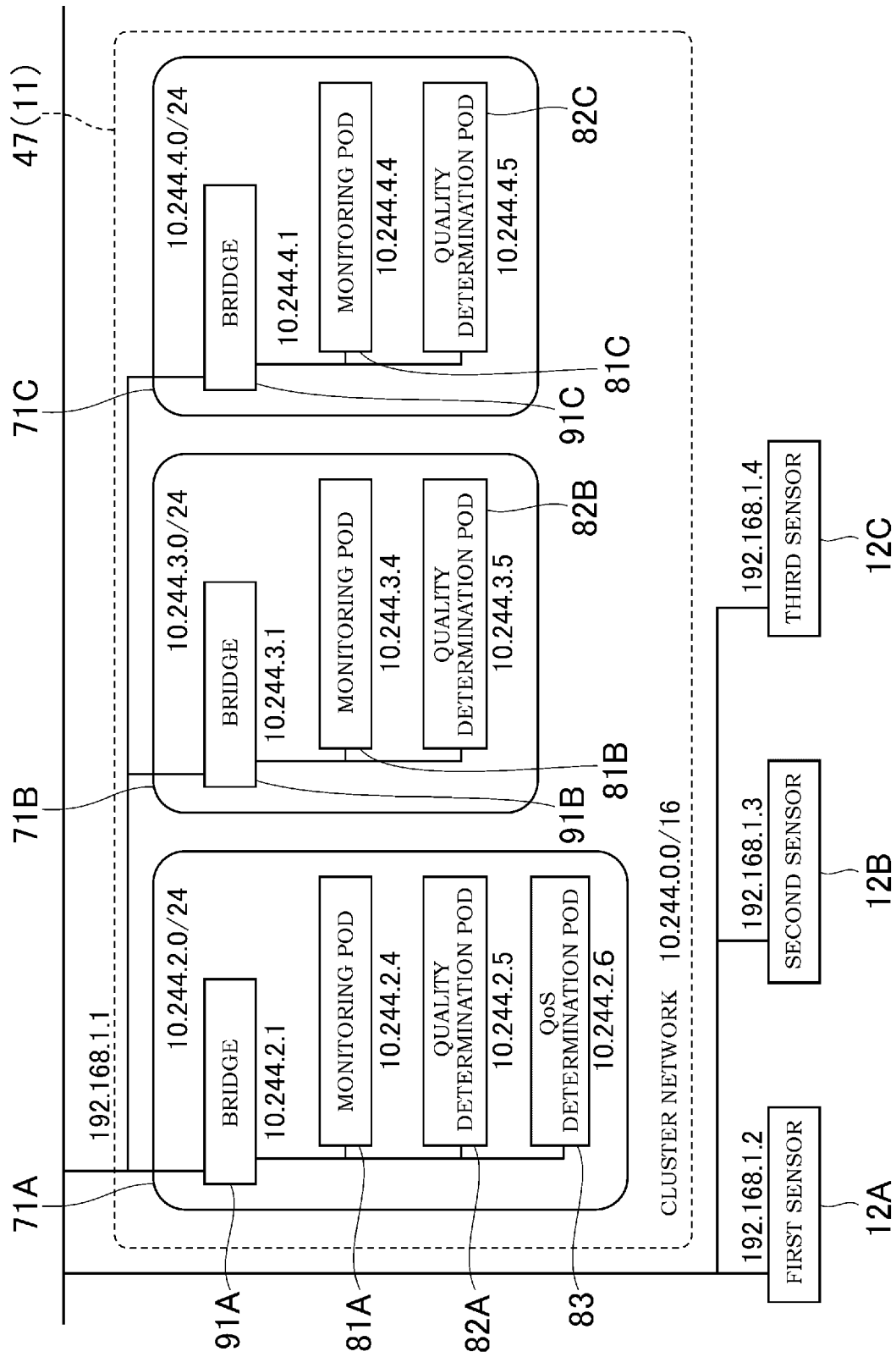
FIG. 9 is a diagram showing a network configuration of the monitoring system.

FIG. 9 is a diagram showing a network configuration of the monitoring system 10.

The monitoring device 11, the first sensor 12A, the second sensor 12B, and the third sensor 12C are connected to the LAN 14, and each has an individual IP address. The IP address in the example in this drawing is 192.168.1.1 for the monitoring device 11, 192.168.1.2 for the first sensor 12A, 192.168.1.3 for the second sensor 12B, and 192.168.1.4 for the third sensor 12C.

When the orchestration tool 45 is used, a cluster network is separately configured inside the cluster 47 in order to perform communication between the nodes 71. In the example of the present embodiment, an IP addresses 10.244.0.0/16, that is, IP addresses from 10.244.0.0 to 10.244.255.255 are used for the cluster network. Each of the nodes 71 in the cluster 47 includes a bridge 91 implemented by software, and the bridge 91 is used for communication of the nodes 71 in the cluster 47.

In the first node 71A, a bridge 91A associates an IP address on the LAN 14 side outside the first node 71A with the IP address of the cluster network inside the first node 71A. In this example, a sub network having an IP addresses of 10.244.2.0/24, that is, IP addresses from 10.244.2.0 to 10.244.2.255 are used in the first node 71A. The bridge 91A has an IP address of 192.168.1.1 outside the node and 10.244.2.1 inside the first node 71A. Then, the bridge 91A performs network setting according to the sub network having an IP address of 10.244.2.0/24 in the first node 71A. The monitoring pod 81A has an IP address of 10.244.2.4, the quality determination pod 82A has an IP address of 10.244.2.5, and the QoS determination pod 83 has an IP address of 10.244.2.6.

Similarly, in the second node 71B, a bridge 91B associates an IP address in the LAN 14 outside the second node 71B with the IP address in the second node 71B. In the second node 71B, a sub network having an IP address of 10.244.3.0/24 is used. The bridge 91B has an IP address of 10.244.3.1 in the second node 71B. Then, the bridge 91B performs the network setting according to the sub network having an IP address of 10.244.3.0/24 in the second node 71B. The monitoring pod 81B has an IP address of 10.244.3.4, and the quality determination pod 82B has an IP address of 10.244.3.5.

In the third node 71C, a bridge 91C associates an IP address in the LAN 14 outside the third node 71C with an IP address inside the third node 71C. In this example, in the third node 71C, a sub network having an IP address of 10.244.4.0/24 is used. The bridge 91C has an IP address of 10.244.4.1 in the third node 71C. Then, the bridge 91C performs the network setting according to the sub network having an IP address of 10.244.4.0/24 in the third node 71C. The monitoring pod 81C has an IP address of 10.244.4.4, and the quality determination pod 82C has an IP address of 10.244.4.5.

By setting the IP addresses in this way, the first sensor 12A can communicate with the monitoring pod 81A via the bridge 91A. Similarly, the second sensor 12B can communicate with the monitoring pod 81B via the bridge 91B, and the third sensor 12C can communicate with the monitoring pod 81C via the bridge 91C. With such a configuration, the physical sensors (12A, 12B, 12C) are associated with the monitoring pods (81A, 81B, 81C), which are management units, on a one-to-one basis. Therefore, not only management of the sensor information becomes easy, but also it becomes suitable for a restoration operation and the like described later. The bridge 91 may be implemented by a part or all of the network proxy 7123 shown in FIG. 7.

The master 72 (not shown) may be used to associate 10.244.0.0/16 of the cluster network with the sub network of 10.244.n.0/24 in each node 71. That is, the master 72 may route to the sub network of 10.244.n.0/24, which is exclusively set for each individual node 71 in 10.244.0.0/16 of the cluster network, that is, 10.244.2.0/24 in the first node 71A, 10.244.3.0/24 in the second node 71B, and 10.244.4.0/24 in the third node 71C.

Figure 10:
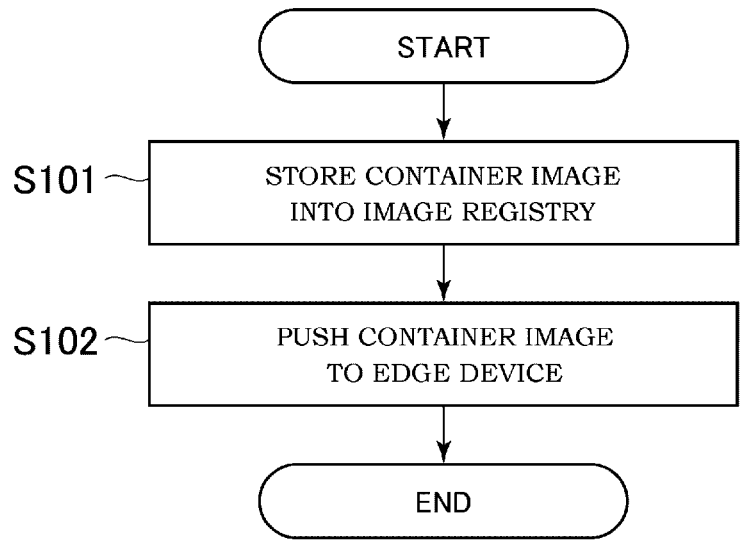
FIG. 10 is a flowchart showing a process of deploying a container to the monitoring device.

FIG. 10 is a flowchart showing a process of deploying the container 46 to the monitoring device 11.

In step S101, the image registry 17 stores an image file of the container 46 programmed to execute a predetermined function in advance. In developing the container 46 on the image registry 17, a container image in an development environment is moved to a release environment.

In step S102, when the image registry 17 receives a deployment request from the node 71, the image registry 17 pushes the container image to the monitoring device 11 via the load balancer 13 and ends the process. In this way, the container 46 is deployed on the monitoring device 11.

When the orchestration tool 45 is used, in step S101, the image registry 17 manages images of the containers 46 in a unit of the pod 711. The image registry 17 stores programs of the operating system 42, the container engine 44, the orchestration tool 45, and the like, and may transmit these programs to the monitoring device 11.

FIG. 11 is a flowchart showing a start process of the pod 711 in the monitoring device 11. The process shown in this flowchart is mainly performed by the application server 721, the manager 722, the scheduler 723, and the data sharing unit 724 of the master 72.

In step S111, the application server 721 receives a request to start the pod 711.

In step S112, the application server 721 updates a pod management sheet stored in the data sharing unit 724 to record that the pod 711 is started.

In step S113, the scheduler 723 monitors the pod management sheet and detects that the pod 711 is started by detecting an update of the pod management sheet.

In step S114, the scheduler 723 determines on which node, among the first node 71A, the second node 71B, and the third node 71C, the pod 711 in which starting is detected is deployed depending on a using state of the hardware resources and the like in each node 71.

In step S115, the scheduler 723 updates the pod management sheet stored in the data sharing unit 724 to record the node 71 on which the pod 711 is newly deployed. The pod management sheet is updated by instructing the application server 721.

In step S116, each node 71 monitors the pod management sheet, and when the node 71 on which the pod 711 is started, which is shown in the pod management sheet, is itself, the image registry 17 is requested to acquire the container image of the pod 711. The node 71 deploys the pod 711 when the container image of the pod 711 is acquired from the image registry 17. Then, the bridge 91 provided in the node 71 performs the network setting on the deployed pod 711 according to the cluster network and the sub network of the node 71, and ends the process.

In this way, the pod 711 can be deployed on the node 71.

Figure 12:
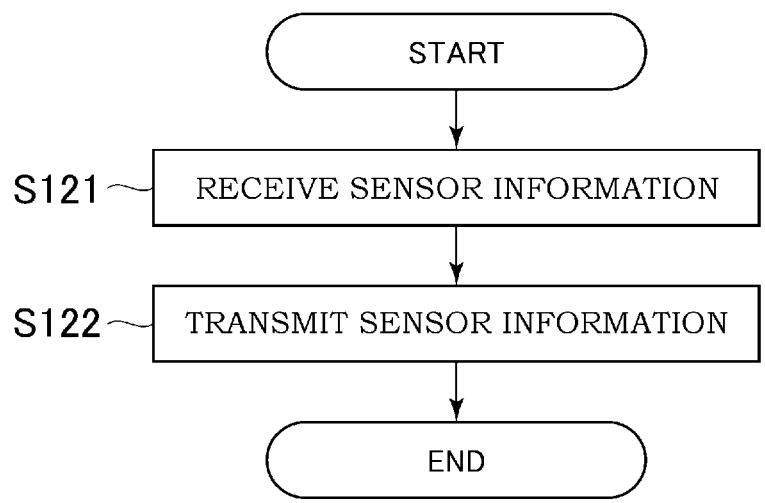
FIG. 12 is a flowchart showing a sensor information acquisition process in the sensor.

FIG. 12 is a flowchart showing an acquisition process of the image data (sensor information) in the sensor 12.

In step S121, the sensor 12 acquires an image signal indicating the product 21 using an image sensor, and creates the image data as the sensor information by converting the image signal into a predetermined image format.

In step S122, the sensor 12 transmits the acquired image data of the product 21 to the monitoring pod 81 deployed on the corresponding node 71, and ends the process.

Figure 13:
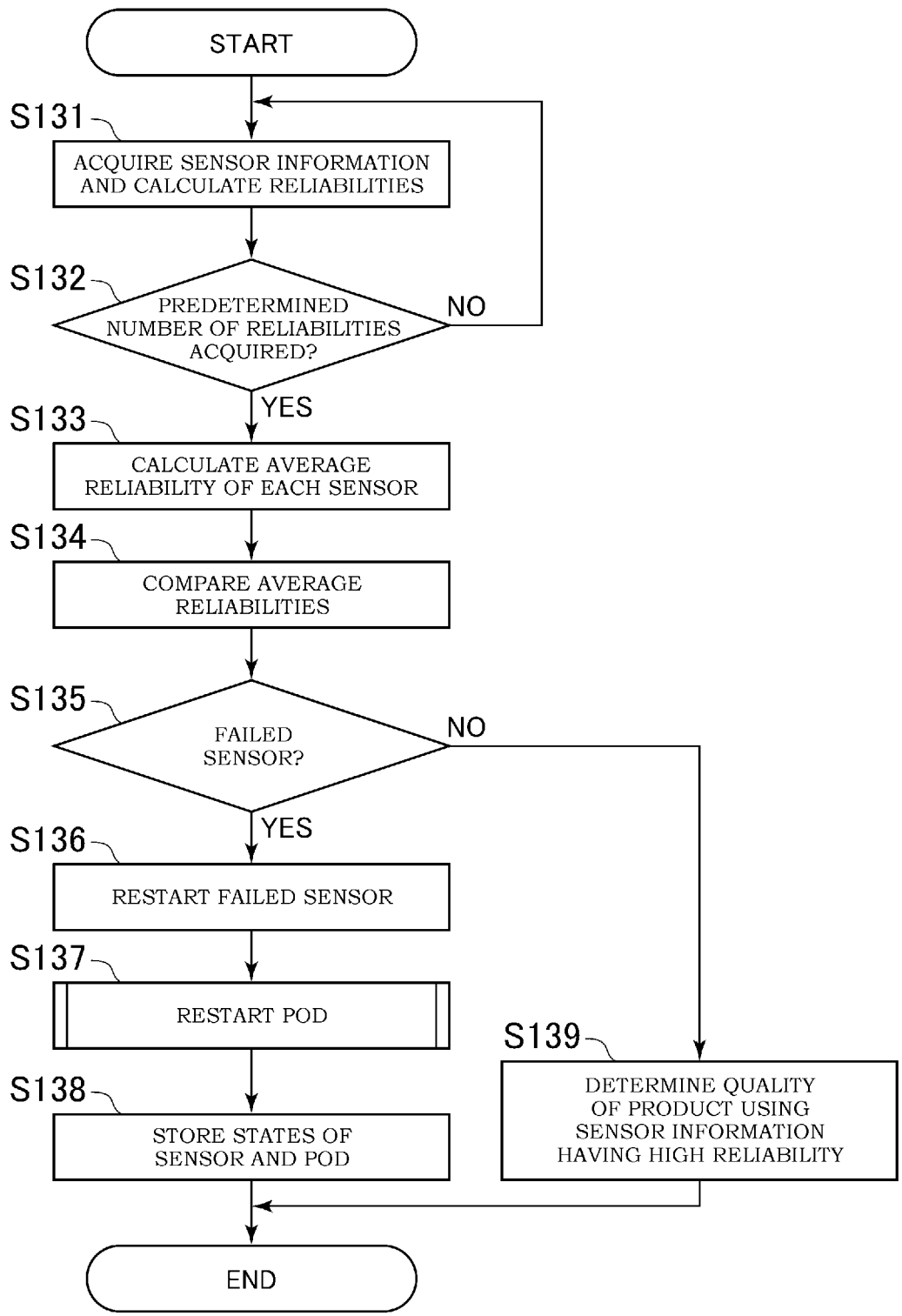
FIG. 13 is a flowchart showing a QoS determination process.

FIG. 13 is a flowchart showing a QoS determination process. The process shown in this flowchart is mainly performed by the monitoring pod 81 and the quality determination pod 82 of each node 71, and the QoS determination pod 83 of the first node 71A.

In step S131, when the monitoring pod 81 acquires the image data of the product 21 from the corresponding sensor 12, the monitoring pod 81 transmits the image data to the quality determination pod 82 of the same node 71. The quality determination pod 82 calculates the reliability of the sensor 12 based on the image data, and outputs the calculated reliability to the QoS determination pod 83.

The quality determination pod 82 calculates the reliability of the sensor 12 by operating the determination engine that performs a reliability determination process on the image data. In the present embodiment, the determination engine is a trained model that has learned the correspondence between the input image and the recognition and detection accuracy of the object in the image. For example, when an image related to the input image data is significantly blurred, when a color that does not normally exist is included, when some obstacle exists, or the like, the reliability of the sensor 12 is calculated to be low. However, when a shadow of the product 21 is reflected in the image data, this shadow does not significantly affect a determination result of the reliability of the sensor 12. A configuration of the determination engine is not limited to one using the machine learning, and may be performed by, for example, template matching with a predetermined image.

In step S132, the QoS determination pod 83 determines whether or not a predetermined number of reliabilities are acquired from the quality determination pods 82A to 82C. For example, the QoS determination pod 83 determines whether or not three reliabilities are acquired from the quality determination pods 82 corresponding to three sensors 12.

If the QoS determination pod 83 does not receive the predetermined number of reliabilities of each sensor 12 from the respective quality determination pods 82 (S132: No), the QoS determination pod 83 returns to the process of step S131. If the QoS determination pod 83 receives the predetermined number of reliabilities from each sensor 12 (S132: Yes), the QoS determination pod 83 then proceeds to a process of step S133. For example, the QoS determination pod 83 determines whether or not the reliabilities of the three sensors 12 are received from the respective quality determination pods 82.

In step S133, the QoS determination pod 83 calculates an average of the received reliabilities of the first sensor 12A, the second sensor 12B, and the third sensor 12C to obtain an average reliability.

In step S134, the QoS determination pod 83 compares the average reliability of each of the first sensor 12A, the second sensor 12B, and the third sensor 12C.

The QoS determination pod 83 determines that all of the first sensor 12A, the second sensor 12B, and the third sensor 12C are operating normally when the average reliabilities of the first sensor 12A, the second sensor 12B, and the third sensor 12C are approximately the same. Regarding the average reliabilities of the first sensor 12A, the second sensor 12B, and the third sensor 12C, when the reliability of one sensor 12 is significantly different from the reliabilities of the other two sensors 12, the QoS determination pod 83 determines that the sensor 12, which has a significantly different reliability, is not operating normally and fails.

The determination that the sensor 12 is not operating normally can be performed by using processes such as standard deviation and dispersion. The QoS determination pod 83 may omit the processes of steps S133 and S134 and determine that the sensor 12 whose reliability is calculated a plurality of times with a large difference from the others fails by using all of the predetermined number of reliabilities for each sensor 12. Further, whether or not the sensor 12 fails may be determined by simply comparing the reliability thereof with a predetermined threshold value.

The QoS determination pod 83 may compare all of the predetermined number of reliabilities of each sensor 12, and determine that the sensor 12 which is determined to have a low reliability even once fails.

When the QoS determination pod 83 determines that all of the first sensor 12A, the second sensor 12B, and the third sensor 12C are operating normally, the QoS determination pod 83 determines that there is no sensor 12 failing (S135: No), and then performs a process of step S139. When the QoS determination pod 83 determines that any one of the first sensor 12A, the second sensor 12B, and the third sensor 12C is not operating normally, the QoS determination pod 83 determines that there is a sensor 12 failing (S135: Yes), and then performs a process of step S136.

In step S136, the QoS determination pod 83 instructs the sensor 12 that fails to restart.

In step S137, the QoS determination pod 83 instructs the monitoring pod 81 and the quality determination pod 82 corresponding to the sensor 12 that fails to restart. A general restart process of the pod 711 including the monitoring pod 81 and the quality determination pod 82 will be described with reference to FIG. 14.

In step S138, the QoS determination pod 83 records the restarted sensor 12 and the monitoring pod 81, outputs information on the restarted sensor 12 and the monitoring pod 81 to the terminal 16, and ends the process.

In step S139, the QoS determination pod 83 determines the quality of the product 21 by using the sensor information acquired by the sensor 12 determined to have the highest reliability. This quality determination may be performed using, for example, a trained model in which a correspondence between the input image and a good quality (or a defective quality) of the product 21 shown in the image is learned, or may be performed by template matching with a predetermined image.

Then, the QoS determination pod 83 transmits a quality result of the determined product 21 to the terminal 16 and ends the process. In step S139, predetermined feedback can be given to the trained model, which is a reliability determination engine, and the determination engine can be made to perform additional learning. As an example, in the determination engine, the trained model may be caused to perform additional learning using other values of the reliabilities of the sensors 12A to 12C.

Instead of the sensor 12 determined to have the highest reliability, the quality of the product 21 may be determined based on a plurality of sensors 12 having a certain degree of reliability or more. The machine learning may be performed in determination and judgment processes of other pods in addition to the determination engine in the QoS determination pod 83.

In this way, in the terminal 16, in addition to the reliabilities of the first sensor 12A, the second sensor 12B, and the third sensor 12C, the quality of the final product 21 and a failure state of the sensor 12 can be displayed.

FIG. 14 is a flowchart showing a restart process of the pod 711 in the monitoring device 11. Similar to the start process of the pod 711 shown in FIG. 11, the process shown in this flowchart is mainly performed by the application server 721, the manager 722, the scheduler 723, and the data sharing unit 724 of the master 72.

In step S141, the application server 721 receives a request to stop the pod 711.

In step S142, the application server 721 updates the pod management sheet stored in the data sharing unit 724 to record that the pod 711 is stopped.

In step S143, the scheduler 723 monitors the pod management sheet and detects that the pod 711 is stopped by detecting the update of the pod management sheet.

In step S144, the scheduler 723 determines on which node, among the first node 71A, the second node 71B, and the third node 71C, the pod 711, which is detected to be restarted, is deployed depending on the using state of the hardware resources and the like in each node 71. The node 71 on which the pod 711 is restarted may be the same as or different from the node 71 on which the pod 711 is deployed before the restart.

In step S145, the scheduler 723 updates the pod management sheet stored in the data sharing unit 724 and records the node 71 on which the pod 711 to be restarted is deployed.

In step S146, each node 71 monitors the pod management sheet, and when the node 71 on which the pod 711 is restarted, which is shown in the pod management sheet, is itself, the image registry 17 is requested to acquire the container image of the pod 711. Then, the node 71 deploys the pod 711 when the container image of the pod 711 is acquired from the image registry 17. Then, the bridge 91 performs the network setting on the deployed pod 711 according to the cluster network and the sub network of the node 71, and ends the process.

In this way, the monitoring system 10 including the monitoring device 11 and the plurality of sensors 12 and implemented by using the container orchestration tool detects that the sensor 12 connected via the LAN 14 is not in a predetermined state (for example, a failure state). Then, by restarting the sensor 12 that is not in such a predetermined state, the monitoring system 10 can be stably operated.

According to the present embodiment, the following effects can be acquired.

According to the monitoring system 10 of the present embodiment, the node 71 includes the quality determination pod 82 that calculates the reliabilities of the sensors 12 based on the sensor information received from the sensors 12, and the QoS determination pod 83 that compares the calculated reliabilities of the plurality of sensors 12. The QoS determination pod 83 monitors the product 21 by determining the quality of the product 21 based on the sensor information of the sensor 12 that is calculated to have a relatively high reliability. The QoS determination pod 83 determines the quality of the product 21 using the sensor information acquired by the sensor 12 having a high reliability among the plurality of sensors 12, so that a monitoring accuracy of the product 21 by the monitoring system 10 can be improved.

Further, according to the monitoring system 10 of the present embodiment, the sensor 12 and the monitoring pod 81 are associated in a one-to-one manner. With such a configuration, even when the monitoring system 10 includes a plurality of sensors 12, the reliability of each sensor 12 can be calculated by the corresponding monitoring pod 81. Therefore, a load can be distributed and a durability of the sensor 12 can be improved, so that the monitoring accuracy of the product 21 by the monitoring system 10 can be improved.

Further, according to the monitoring system 10 of the present embodiment, in the determination engine used for the quality determination pod 82, by using the calculated reliability of each sensor 12, the trained model may be caused to perform the additional machine learning. In this way, it is possible to improve an accuracy of calculating the reliability of the sensor 12 by the quality determination pod 82. Therefore, the monitoring accuracy of the product 21 by the monitoring system 10 can be improved.

Further, according to the monitoring system 10 of the present embodiment, the QoS determination pod 83 determines whether or not all of the sensors 12 are operating normally by comparing the reliabilities of the plurality of sensors 12, and determines that the sensor 12 having a low reliability fails and restarts the sensor 12.

In the present embodiment, three sensors 12, which are the first sensor 12A, the second sensor 12B, and the third sensor 12C, are provided. When these three sensors 12 are operating normally, the reliabilities of these sensors 12 are approximately equal.

However, when one of these reliabilities is significantly different from the other two, the QoS determination pod 83 determines that the sensor 12, which has a significantly different reliability, is not operating normally and fails. Then, the QoS determination pod 83 restarts the sensor 12 determined to fail.

With this configuration, a failure of the sensor 12 can be detected and the failed sensor 12 can be restarted, so that the monitoring system 10 can be operated more stably.

Further, according to the monitoring system 10 of the present embodiment, the monitoring pod 81 and the quality determination pod 82 corresponding to the sensor 12 determined to fail are restarted. In the container orchestration technique, it is known that the pod 711 can be restarted seamlessly. Further, when a hardware resource on which the pod 711 operates cannot be used due to a failure or the like, the pod 711 is automatically restarted on the node 71 of the other hardware. Therefore, even if the hardware on which the node 71 operates fails, the pod 711 can be restarted on the hardware that operates normally, so that the system can be operated stably.

Further, according to the monitoring system 10 of the present embodiment, the sensor 12 and the monitoring device 11 are connected to the LAN 14, and the monitoring device 11 monitors the sensor information acquired from the sensor 12. In the monitoring device 11, the container engine 44 logically allocates the hardware resources of the operating system 42 to construct the node 71, and the orchestration tool 45 manages the node 71. The node 71 manages the operations of the pod 711 including one or more containers 46, and provides the cluster network, which is a virtual second network used for communication between the pods 711. Then, the monitoring device 11 includes the bridge 91 that associates the LAN 14 with the cluster network.

In such a configuration, the bridge 91 associates the LAN 14 with the cluster network. As shown in FIG. 9, for example, the bridges 91A to 91C associate 192.168.1.1 on the LAN 14 side with the cluster network 10.244.0.0/16 formed of a plurality of nodes 71.

The bridge 91A of the first node 71A associates 192.168.1.1, which is the network on the LAN 14 side, with 10.244.2.0/24, which is the sub network in the cluster network. That is, the bridge 91A assigns the IP address of 10.244.2.4 to the monitoring pod 81A of the first node 71A.

Therefore, the first sensor 12A connected to the LAN 14 and having an IP address of 192.168.1.2 can communicate with the monitoring pod 81A of the first node 71A via the bridge 91A. As a result, the monitoring pod 81A included in the monitoring device 11 can acquire the sensor information of the first sensor 12A. In this way, the monitoring system 10 can monitor the sensor information acquired from the sensor 12.

Further, according to the monitoring system 10 of the present embodiment, the bridge 91 is provided for each node 71. In the example of FIG. 9, the bridge 91A is provided in the first node 71A and associates 192.168.1.1 with the sub network of 10.244.2.0/24. The bridge 91B is provided in the second node 71B and associates 192.168.1.1 with the sub network of 10.244.3.0/24. The bridge 91C is provided in the third node 71C and associates 192.168.1.1 with the sub network of 10.244.4.0/24. In the network of 10.244.0.0/16, a plurality of 10.244.n.0/24 (n=0 to 255) are exclusive without overlapping each other.

By providing the bridge 91 for each node 71 in this way, it is possible to limit the IP addresses in the sub network in the node 71 handled by each bridge 91. For example, in the bridge 91A, the sub network of 10.244.2.0/24, that is, 10.244.2.0 to 10.244.2.255 are handled. By limiting the IP addresses handled for each node 71 in this way, it is possible to reduce an IP address conversion process in the bridge 91A. Therefore, a processing speed and a communication speed of the monitoring system 10 can be improved.

(First Modification)

In the above-described embodiment, an example in which the monitoring pod 81A that receives the sensor information of the first sensor 12A, the monitoring pod 81B that receives the sensor information of the second sensor 12B, and the monitoring pod 81C that receives the sensor information of the third sensor 12C are deployed on different nodes 71 is described, but the present invention is not limited thereto. In a first modification, an example in which the monitoring pods 81A to 81C are deployed on the same node 71 will be described.

Figure 15:
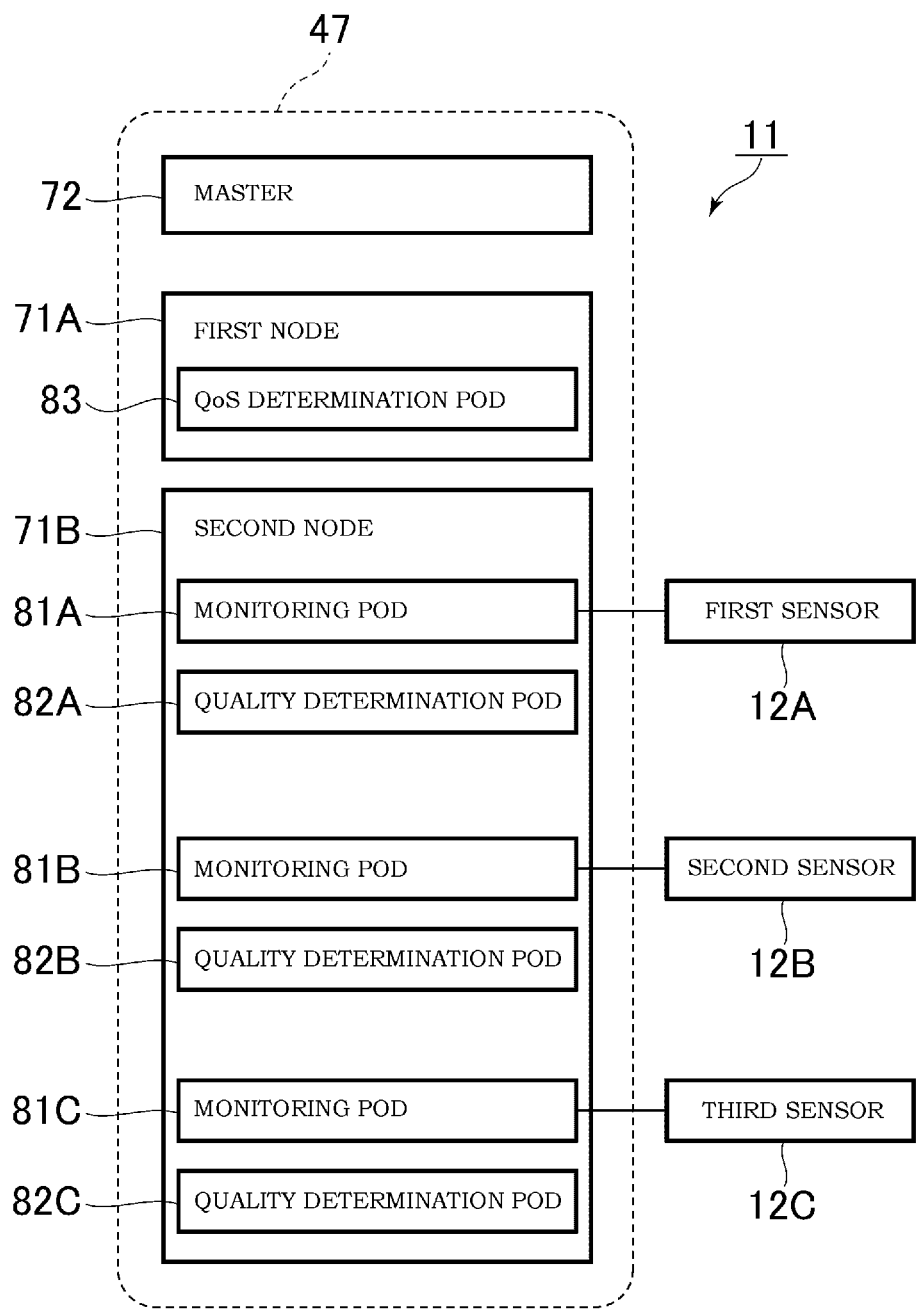
FIG. 15 is a schematic configuration diagram of a cluster according to a first modification.

FIG. 15 is a schematic configuration diagram of the cluster 47 according to the first modification.

In the first modification, the QoS determination pod 83 is deployed on the first node 71A in the cluster 47. Then, the monitoring pod 81A and the quality determination pod 82A corresponding to the first sensor 12A, the monitoring pod 81B and the quality determination pod 82B corresponding to the second sensor 12B, and the monitoring pod 81C and the quality determination pod 82C corresponding to the third sensor 12C are deployed on the second node 71B.

Figure 16:
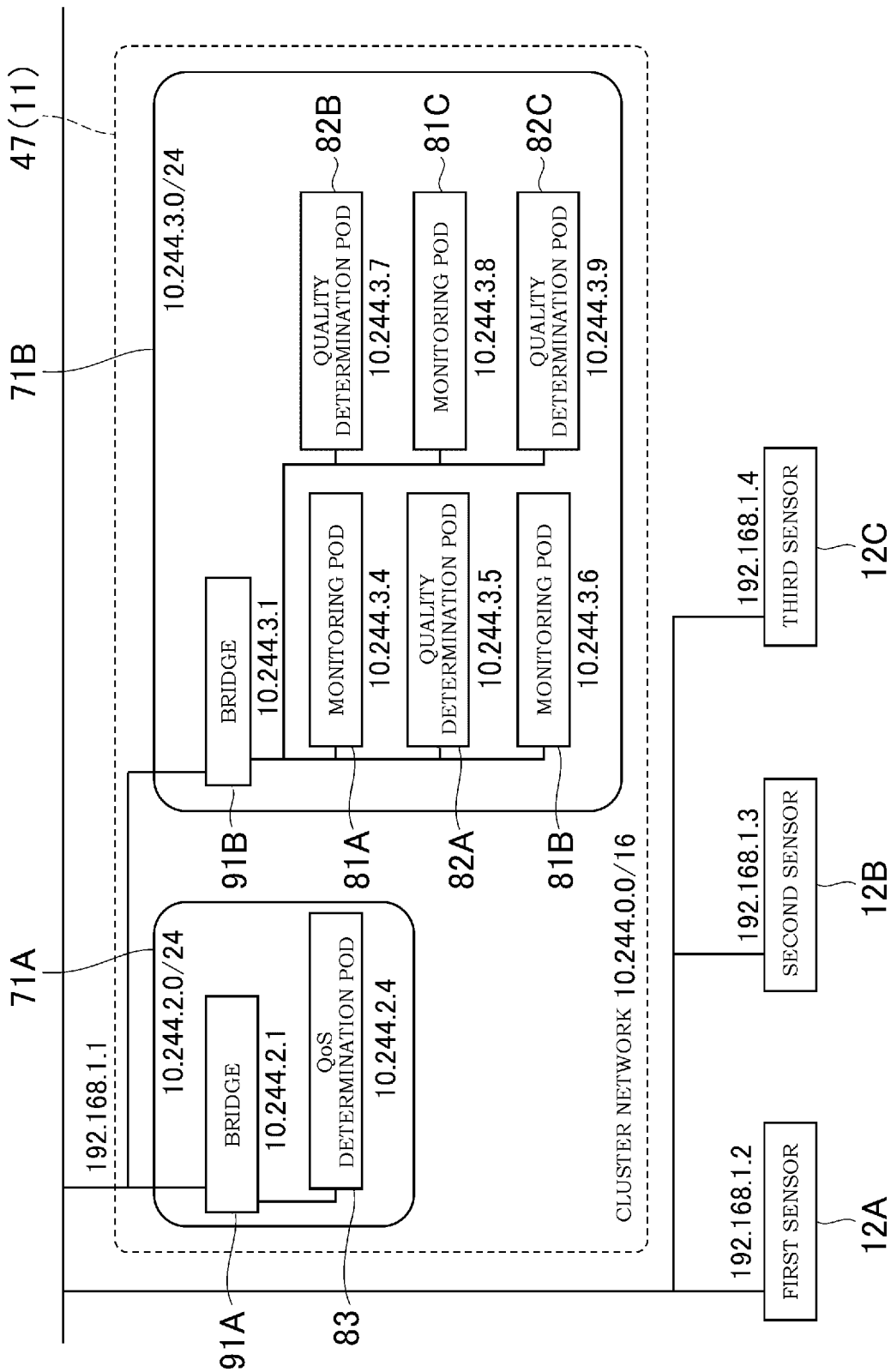
FIG. 16 is a diagram showing a network configuration of a monitoring system.

FIG. 16 is a diagram showing a network configuration of the monitoring system 10.

The monitoring device 11 is connected to the LAN 14 and has an IP address of 192.168.1.1. The cluster network of the cluster 47, which is implemented by the hardware resources of the monitoring device 11, is 10.244.0.0/16.

In the first node 71A, the bridge 91A associates the IP addresses inside and outside the first node 71A. Inside the first node 71A, the sub network of 10.244.2.0/24 is used, and the bridge 91A is 10.244.2.1 and the QoS determination pod 83 is 10.244.2.4.

In the second node 71B, the bridge 91B associates the IP addresses inside and outside the second node 71B. Inside the second node 71B, the sub network of 10.244.3.0/24 is used, and the bridge 91A is 10.244.3.1.

Then, the bridge 91A sets the network according to the sub network of 10.244.3.0/24. In the configurations corresponding to the first sensor 12A, the monitoring pod 81A is 10.244.3.4 and the quality determination pod 82A is 10.244.3.5. In the configurations corresponding to the second sensor 12B, the monitoring pod 81B is 10.244.3.6, and the quality determination pod 82B is 10.244.3.7. In the configurations corresponding to the third sensor 12C, the monitoring pod 81C is 10.244.3.8 and the quality determination pod 82B is 10.244.3.9.

In this configuration, the first sensor 12A located outside the cluster network can communicate with the monitoring pod 81A in the second node 71B via the bridge 91B. Similarly, the second sensor 12B can communicate with the monitoring pod 81B via the bridge 91B, and the third sensor 12C can communicate with the monitoring pod 81C via the bridge 91B. The monitoring pods 81A, 81B, 81C can communicate with the QoS determination pod 83 via the bridges 91B, 91A.

In such a monitoring system 10, the monitoring system 10 including the monitoring device 11 and the plurality of sensors 12 and using the orchestration tool 45 can also be configured.

(Second Modification)

In the above-described embodiment and the first modification, an example in which the orchestration tool 45 is not used for the sensor 12 is described, but the present invention is not limited thereto. In the second modification, an example in which the orchestration tool 45 is used for the sensor 12 will be described.

Figure 17:
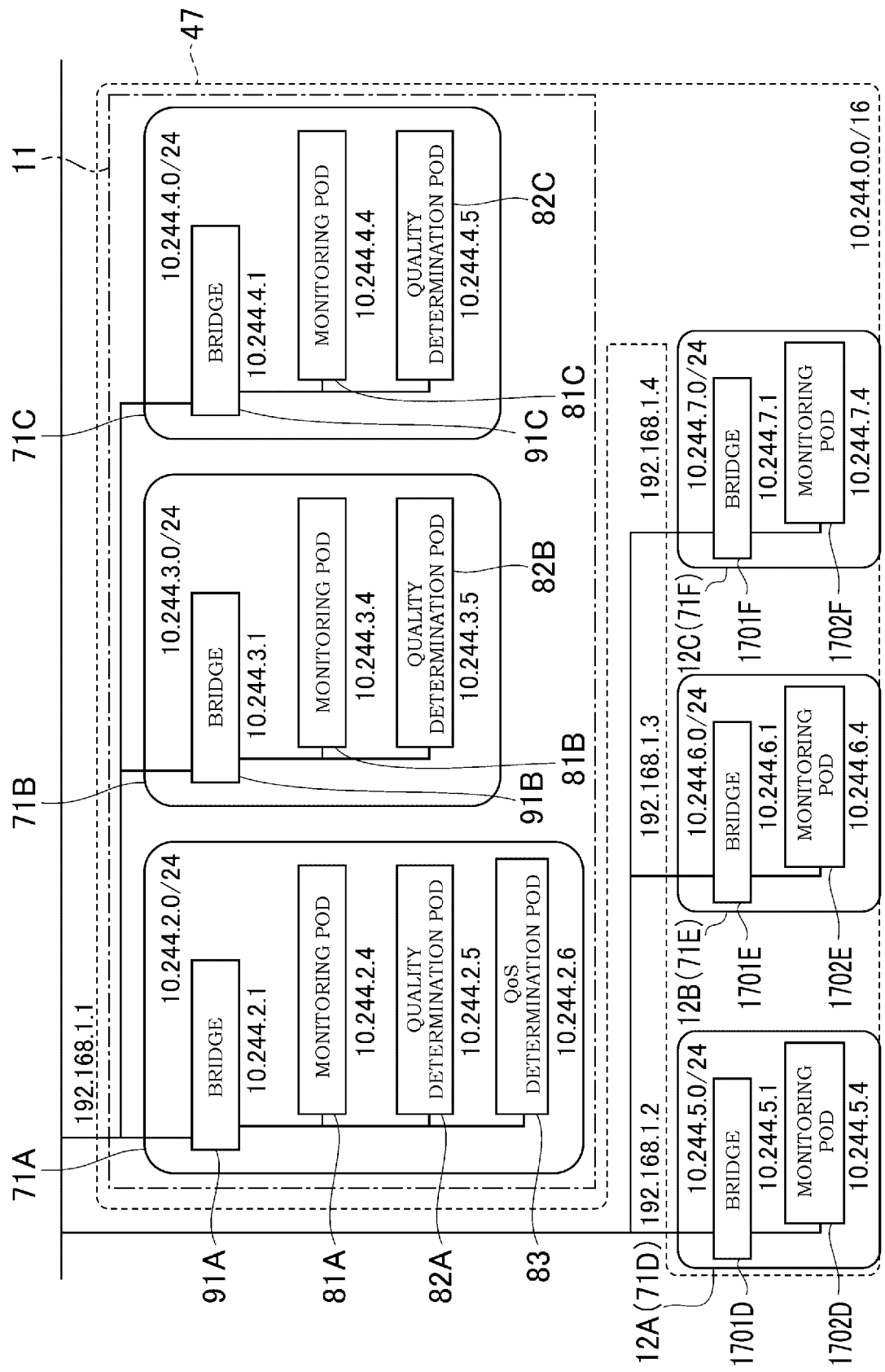
FIG. 17 is a diagram showing a network configuration of a monitoring system according to a second modification.

FIG. 17 is a diagram showing a network configuration of the monitoring system 10 according to the second modification.

The first sensor 12A, the second sensor 12B, and the third sensor 12C include the orchestration tool 45. Therefore, the cluster 47 is implemented by the hardware resources of the monitoring device 11, the first sensor 12A, the second sensor 12B, and the third sensor 12C. The IP address of the sub network of 10.244.0.0/16 in the cluster 47 is used.

The first node 71A, the second node 71B, and the third node 71C are formed of the monitoring device 11. The first sensor 12A, the second sensor 12B, and the third sensor 12C are respectively provided with a fourth node 71D, a fifth node 71E, and a sixth node 71F.

In the fourth node 71D provided in the first sensor 12A, IP addresses are set according to the sub network of 10.244.5.0/24 in the cluster network. A bridge 1701D included in the first sensor 12A has an IP address of 192.168.1.2 outside the node and 10.244.5.1 inside the node. A detection pod 1702D is 10.244.5.4. The detection pod 1702D generates image data and the like.

In the fifth node 71E provided in the second sensor 12B, IP addresses are set according to the sub network of 10.244.6.0/24 in the cluster network. A bridge 1701E included in the second sensor 12B is 192.168.1.3 outside the node and 10.244.6.1 inside the node. A detection pod 1702E is 10.244.6.4.

In the sixth node 71F provided in the third sensor 12C, IP addresses are set according to the sub network of 10.244.7.0/24 in the cluster network. A bridge 1701F included in the third sensor 12C is 192.168.1.4 outside the node and 10.244.7.1 inside the node. A detection pod 1702F is 10.244.7.4.

In such a configuration, the sensor 12 located outside the monitoring device 11 forms the cluster 47 together with the monitoring device 11. Therefore, the detection pod 1702D of the first sensor 12A can communicate with the monitoring pod 81A of the first node 71A via the cluster network. Similarly, the detection pod 1702E of the second sensor 12B can communicate with the monitoring pod 81B of the second node 71B via the cluster network, and the detection pod 1702F of the third sensor 12C can communicate with the monitoring pod 81C of the third node 71C.

In such a monitoring system 10, the monitoring system 10 including the monitoring device 11 and the plurality of sensors 12 and using the orchestration tool 45 can also be configured.

(Third Modification)

In the above-described embodiment and the first and second modifications, examples in which the monitoring system 10 includes the monitoring device 11, the sensors 12, and the load balancer 13 are described, but the present invention is not limited thereto. In a third modification, an example in which the monitoring system 10 further includes additional servers will be described.

Figure 18:
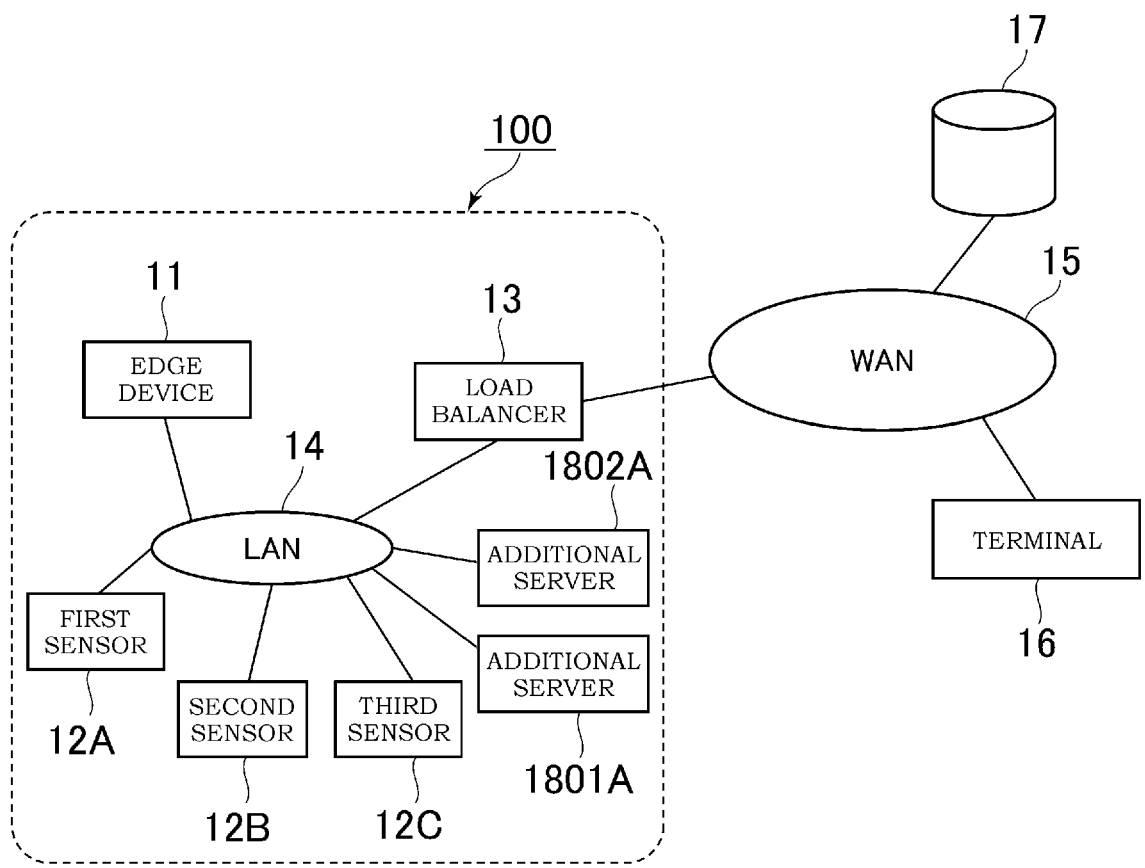
FIG. 18 is a block diagram showing a configuration of a monitoring system according to a third modification.

FIG. 18 is a block diagram showing a configuration of the monitoring system 10 according to the third modification.

In this drawing, as compared with the example shown in FIG. 1, additional servers 1801A and 1801B are further connected to the LAN 14 in the monitoring system 10.

The additional servers 1801A and 1801B are general-purpose computers and are provided with the orchestration tool 45. Hardware and software of the additional servers 1801A and 1801B are similar to the configurations shown in FIGS. 3 and 4.

Figure 19:
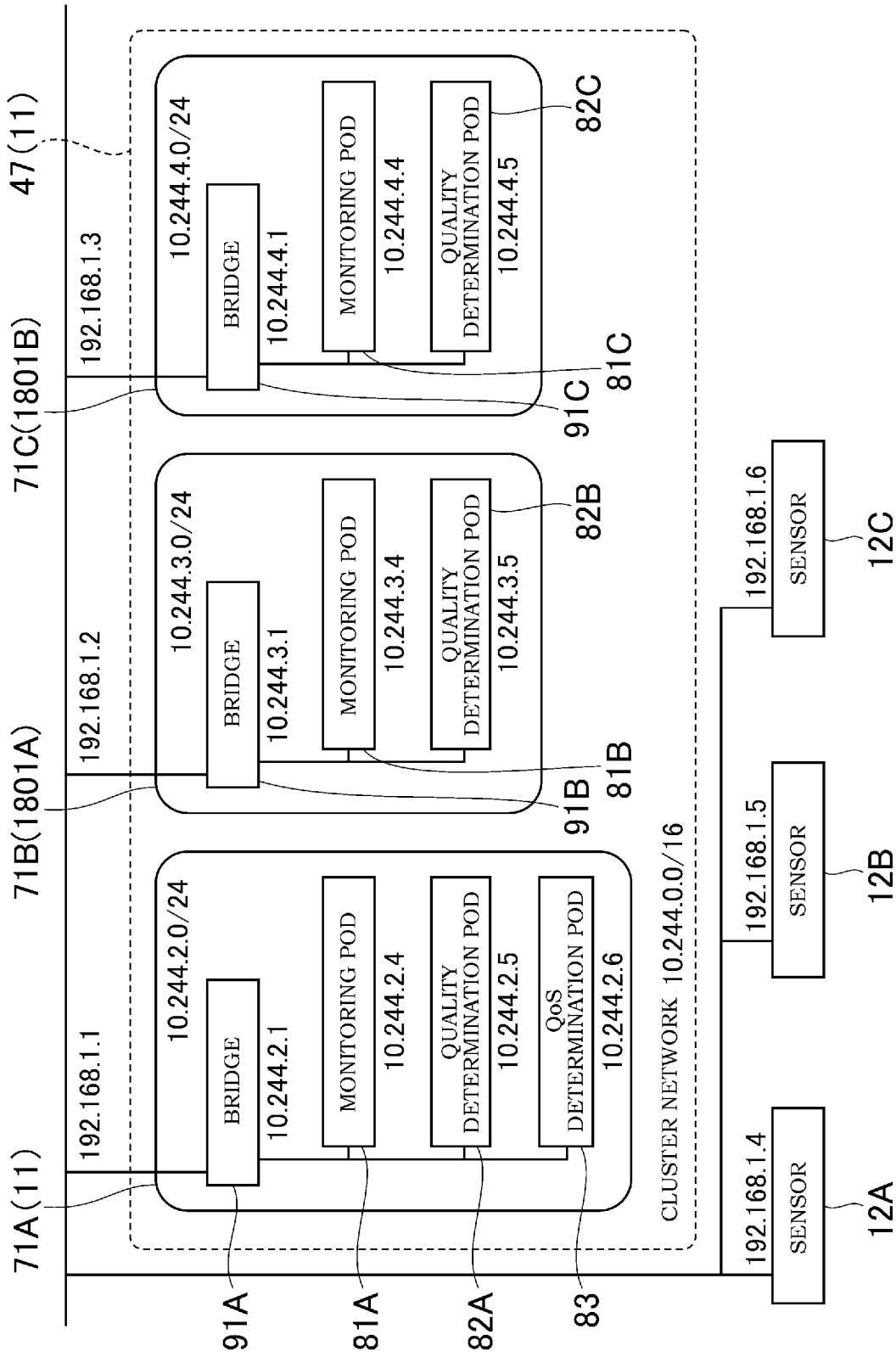
FIG. 19 is a diagram showing a network configuration of the monitoring system.

FIG. 19 is a diagram showing a network configuration of the monitoring system 10.

The first node 71A is provided in the monitoring device 11, the second node 71B is provided in the additional server 1801A, and the third node 71C is provided in the additional server 1801B. Then, the monitoring device 11 and the additional servers 1801A and 1801B are connected to the LAN 14, and IP addresses thereof are 192.168.1.1, 192.168.1.2, and 192.168.1.3, respectively. IP addresses of the first sensor 12A, the second sensor 12B, and the third sensor 12C are 192.168.1.4, 192.168.1.5, and 192.168.1.6, respectively.

In the first node 71A, IP addresses in the sub network of 10.244.2.0/24 is used. The bridge 91A has an IP address of 192.168.1.1 outside the first node 71A and 10.244.2.1 inside the first node 71A. The monitoring pod 81A is 10.244.2.4, the quality determination pod 82A is 10.244.2.5, and the QoS determination pod 83 is 10.244.2.6.

In the second node 71B, IP addresses of the sub network of 10.244.3.0/24 are used. The bridge 91B has an IP address of 192.168.1.2 outside the second node 71B and 10.244.3.1 inside the second node 71B. The monitoring pod 81A is 10.244.3.4 and the quality determination pod 82A is 10.244.3.5.

In the third node 71C, IP addresses of the sub network of 10.244.4.0/24 are used. The bridge 91C has an IP address of 192.168.1.3 outside the third node 71C and 10.244.4.1 inside the third node 71C. The monitoring pod 81A is 10.244.4.4, and the quality determination pod 82A is 10.244.4.5.

In this configuration, the first sensor 12A can communicate with the monitoring pod 81A in the first node 71A via the bridge 91A. Similarly, the second sensor 12B communicates with the monitoring pod 81B in the second node 71B via the bridge 91B and the third sensor 12C communicates with the monitoring pod 81C in the third node 71C via the bridge 91C.

According to the third modification, the following effects can be acquired.

Further, according to the monitoring system 10 of the present embodiment, the monitoring system 10 further includes the additional servers 1801A and 1801B, and constitutes one or more nodes 71 in each of the monitoring device 11 and the additional server 1801. That is, as shown in FIGS. 18 and 19, the monitoring device 11 is provided with the first node 71A, and the additional server 1801A is provided with the first node 71A.

In such a case, the bridges 91A to 91C are provided for different hardware in the monitoring device 11 and the additional servers 1801A and 1801B, and associate the LAN 14 with the sub network that is exclusively set for each hardware. That is, the bridge 91A of the first node 71A is converted to a sub network of 10.244.2.0/24 in the first node 71A of the cluster 47, the bridge 91B of the second node 71B is converted to a sub network of 10.244.3.0/24 in the second node 71B, and the bridge 91C of the third node 71C is converted to a sub network of 10.244.4.0/24 in the third node 71C. These sub networks of 10.244.2.0/24, 10.244.3.0/24, and 10.244.4.0/24 are parts of the cluster network 10.244.0.0/16 and have a unique and exclusive relation with each other.

With such a configuration, since hardware of the additional servers 1801A and 1801B is added to the cluster 47 and the hardware resources can be increased, the processing speed of the monitoring system 10 can be improved. Further, since the bridge 91 is provided for each hardware, a routing delay caused by network conversion can be prevented, and the processing speed of the monitoring system 10 can be improved.

(Fourth Modification)

In the above-described embodiment and the first to third modifications, examples in which the sensor 12 communicates with one monitoring pod 81 are described, but the present invention is not limited thereto. In a fourth modification, an example in which the sensor 12 communicates with two monitoring pods 81 will be described.

Figure 20:
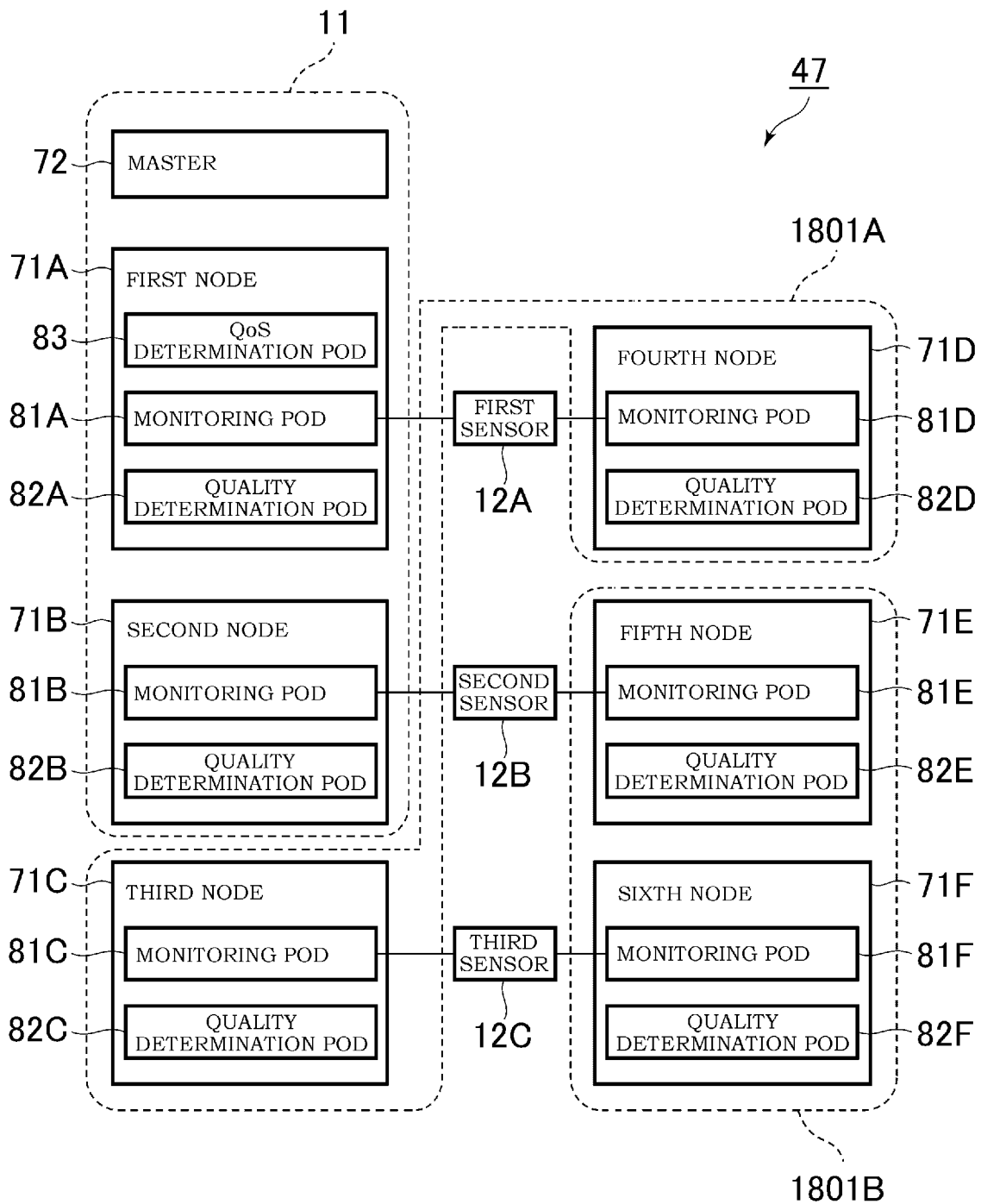
FIG. 20 is a schematic configuration diagram of a cluster according to a fourth modification.

FIG. 20 is a schematic configuration diagram of the cluster 47 according to the fourth modification. As in the third modification shown in FIG. 13, the monitoring system 10 includes the two additional servers 1801A and 1801B.

The master 72, the first node 71A, and the second node 71B are provided in the monitoring device 11. The third node 71C and the fourth node 71D are provided in the additional server 1801A. The fifth node 71E and the sixth node 71F are provided in the additional server 1801B.

In the first node 71A to the third node 71C, the same pods as in FIG. 8 are deployed. A monitoring pod 81D and a quality determination pod 82D are deployed on the fourth node 71D, a monitoring pod 81E and a quality determination pod 82E are deployed on the fifth node 71E, and a monitoring pod 81F and a quality determination pod 82F are deployed on the sixth node 71F.

The first sensor 12A communicates with the monitoring pod 81A of the first node 71A and the monitoring pod 81D of the fourth node 71D. The second sensor 12B communicates with the monitoring pod 81B of the second node 71B and the monitoring pod 81E of the fifth node 71E. The third sensor 12C communicates with the monitoring pod 81C of the third node 71C and the monitoring pod 81F of the sixth node 71F.

In this way, the monitoring system 10 is configured such that the sensor information of each sensor 12 is transmitted to a plurality of monitoring pods 81 of different nodes 71, so that a robustness of the system can be improved.

According to the fourth modification, the following effects can be acquired.

According to the monitoring system 10 of the fourth modification, the sensor information of the sensor 12 is transmitted to different nodes 71 implemented by two or more different hardware in the monitoring device 11 and the additional server 1801. Specifically, as shown in FIG. 20, the image data of the first sensor 12A is transmitted to both the monitoring pods 81A and 81D, the image data of the second sensor 12B is transmitted to both the monitoring pods 81B and 81E, and the image data of the third sensor 12C is transmitted to both the monitoring pods 81C and 81F.

Here, among the monitoring pods 81A and 81D and the quality determination pods 82A and 82D connected to the first sensor 12A, a case where the reliability of the first sensor 12A calculated by the monitoring pod 81A and the quality determination pod 82A decreases, but the reliability of the first sensor 12A calculated by the monitoring pod 81D and the quality determination pod 82D does not decrease will be considered. In such a case, the monitoring pod 81A and the quality determination pod 82A used for calculating the decreased reliability may be restarted. During the restart of the monitoring pod 81A and the quality determination pod 82A, since the sensor information acquired by the first sensor 12A is processed by the monitoring pod 81D and the quality determination pod 82D, the monitoring system 10 can be operated stably. Further, since it is not necessary to restart the sensor 12, unnecessary processes can be reduced.

In the above-described embodiment and modifications, a camera (imaging sensor) is mainly exemplified as the sensor 12A, but the sensor is not limited to such a sensor. Therefore, the sensor may be, for example, a temperature sensor, an illuminance sensor, a humidity sensor, a pressure sensor, a voltage sensor, a current sensor, an electromagnetic flowmeter that measures a flow rate in a piping, a photoelectric sensor that detects presence or absence of an object and a change in surface conditions using various properties of light, a displacement/length sensor that measures a distance to an object and measures dimensions such as a minute step, height, width, and thickness of the object, an image sensor, a proximity sensor, a photomicrosensor that is a small and low-cost optical sensor for detecting a work piece, a sensor rotary encoder that converts an amount of mechanical displacement of rotation into an electric signal and processes the signal to detect position, speed, and the like, an ultrasonic sensor that calculates a distance to an object, a leakage sensor that detects leakage of chemicals and pure water, a gyro sensor, an acceleration sensor, an air pressure sensor, a magnetic orientation sensor, a global positioning system (GPS), an infrared sensor, a voice recognition sensor, a vibration sensor, a load sensor, a position sensor that detects movement of an object and converts the movement into a signal suitable for processing transmission or control, a biosensor, a tactile sensor, a remote sensing device (light detection and ranging (LiDAR)), an X-ray sensor, or a combination of these sensors.

Although the embodiment of the present invention has been described above, the above-mentioned embodiment is merely a part of application examples of the present invention, and does not mean that the technical scope of the present invention is limited to a specific configuration of the above-described embodiment.

REFERENCE SIGNS LIST

10 monitoring system
11 monitoring device
12 sensor
13 load balancer
16 terminal
17 image registry
21 product
22 belt conveyor
31 control unit
32 storage unit
41 hardware
42 operating system
44 container engine
45 orchestration tool
46 container
47 cluster
51 control unit
52 storage unit
71 node
72 master
81 monitoring pod
82 quality determination pod
83 QoS determination pod
91, 1701 bridge
711 pod
1801 additional server

The invention claimed is:

1. A sensor information processing system, comprising:
one or more sensors; and
one or more information processing devices connected to the sensor, wherein
the information processing device includes
a container engine configured to logically allocate hardware resources on an operating system, provide a cluster for operating a container using the allocated hardware resources, and operate the container on the cluster, and
an orchestration tool configured to provide a node that serves as an execution environment for a pod including one or more containers in the cluster, manage an operation of the pod on the node, and perform a restoration operation on the pod when the pod is not in a predetermined operating state, and
the pods includes
a reliability calculation pod configured to calculate a reliability of each sensor based on sensor information acquired from the sensor, and
a sensor information processing pod configured to perform predetermined information processing based on sensor information from one or more of the sensors calculated to have a high reliability by the reliability calculation pod.

2. The sensor information processing system according to claim 1, wherein
the sensors and the pods are provided to associate with each other in a one-to-one manner.

3. The sensor information processing system according to claim 1, wherein
in the calculation by the reliability calculation pod, the reliability of each sensor is calculated based on a trained model generated by predetermined machine learning.

4. The sensor information processing system according to claim 3, wherein
the trained model performs machine learning based on the reliability of each sensor calculated by the reliability calculation pod.

5. The sensor information processing system according to claim 1, wherein
the sensor is an imaging sensor configured to acquire image information, and
the predetermined information processing in the sensor information processing pod is an object recognition process or an object detection process.

6. The sensor information processing system according to claim 1, wherein the pods further includes a restart process pod configured to perform a restart process on the sensor whose reliability is calculated to be low by the reliability calculation pod.

7. The sensor information processing system according to claim 6, wherein the restart process pod further performs a process of restarting a pod corresponding to the restarted sensor.

8. A method for controlling a sensor information processing system including one or more sensors and one or more information processing devices connected to the sensor, the method comprising:

a step of providing a container engine configured to logically allocate hardware resources on an operating system, construct a cluster for operating a container using the allocated hardware resources, and operate the container on the cluster;

a step of providing an orchestration tool configured to construct a node that serves as an execution environment for a pod including one or more containers in the cluster, manage an operation of the pod on the node, and perform a restoration operation on the pod when the pod is not in a predetermined operating state;

a reliability calculation step of calculating, by a reliability calculation pod included in the pods, a reliability of each sensor based on sensor information acquired from the sensor; and a sensor information processing step of performing, by a sensor information processing pod included in the pods, predetermined information processing based on sensor information from one or more of the sensors calculated to have a high reliability by the reliability calculation pod.

* * * * *